(12) United States Patent  
Gaillard et al.

(10) Patent No.: US 12,141,360 B2  
(45) Date of Patent: Nov. 12, 2024

(54) THREE-DIMENSIONAL TOUCH INTERFACE PROVIDING HAPTIC FEEDBACK

(71) Applicant: VIBRA NOVA, Saint-Paul-de-Varces (FR)

(72) Inventors: Maxime Gaillard, Saint-Martin-d'Hères (FR); Mickael Cottin-Bizonne, Saint-Martin-d'Hères (FR); Matthieu Rupin, Saint-Martin-d'Hères (FR)

(73) Assignee: VIBRA NOVA, Saint-Paul-de-Varces (FR)

( * ) Notice: Subject to any disclaimer, the term of this patent is extended or adjusted under 35 U.S.C. 154(b) by 0 days.

(21) Appl. No.: 18/250,724

(22) PCT Filed: Oct. 22, 2021

(86) PCT No.: PCT/EP2021/079407  
§ 371 (c)(1),  
(2) Date: Apr. 26, 2023

(87) PCT Pub. No.: WO2022/090091  
PCT Pub. Date: May 5, 2022

(65) Prior Publication Data  
US 2023/0400924 A1 Dec. 14, 2023

(30) Foreign Application Priority Data  
Oct. 26, 2020 (FR) ...................... 2010956

(51) Int. Cl.  
*G06F 3/044* (2006.01)  
*G06F 3/01* (2006.01)  
(Continued)

(52) U.S. Cl.  
CPC ............ *G06F 3/016* (2013.01); *G06F 3/0362* (2013.01); *G06F 3/0393* (2019.05); *G06F 3/044* (2013.01)

(58) Field of Classification Search  
CPC ...... G06F 3/016; G06F 3/0362; G06F 3/0393; G06F 3/041; G06F 3/044  
See application file for complete search history.

(56) References Cited

U.S. PATENT DOCUMENTS 8,405,618 B2 3/2013 Colgate et al.  
10,445,994 B2 10/2019 Ramsay et al.  
(Continued)

FOREIGN PATENT DOCUMENTS

EP 1956466 B1 8/2013  
EP 2461233 B1 4/2014  
(Continued)

OTHER PUBLICATIONS

Biet et al., "Squeeze film effect for the design of an ultrasonic tactile plate," IEEE Transactions on Ultrasonics, Ferroelectrics and Frequency Control, IEEE, 2007, 54 (12), pp. 2678-2688.  
(Continued)

*Primary Examiner* — Sanghyuk Park  
(74) *Attorney, Agent, or Firm* — TraskBritt

(57) ABSTRACT

A touch interface, intended to control a device and to be touched by an external body, includes a plate, at least one transducer, a control member, a sensor, and a control unit. The at least one transducer is configured to apply a variable amplitude pressure to the plate to vibrate the plate. The control member extends from the plate, between a proximal surface, integral with the plate, and a distal surface. The control member is intended to be in contact with an external body. The sensor is configured to emit a state signal. The state signal is representative of contact of the external body on the control member. The control unit is connected to the sensor and is configured to send, on the basis of the state  
(Continued)

signal, an activation signal to at least one transducer, to form a vibration propagating along the plate to the control member.

23 Claims, 11 Drawing Sheets

(51) Int. Cl.
    *G06F 3/0362*     (2013.01)
    *G06F 3/039*     (2013.01)

(56) References Cited

U.S. PATENT DOCUMENTS

| | | | |
|---|---|---|---|
| 11,029,719 | B2 | 6/2021 | Klein et al. |
| 2011/0285637 | A1 | 11/2011 | Karkkainen |
| 2011/0291821 | A1* | 12/2011 | Chung .................. G06F 3/0416 340/407.2 |
| 2012/0267221 | A1* | 10/2012 | Gohng .................. G06F 3/0338 200/61.54 |
| 2014/0118127 | A1 | 5/2014 | Levesque et al. |
| 2015/0185848 | A1* | 7/2015 | Levesque ............ G06F 3/03547 345/173 |
| 2016/0328019 | A1 | 11/2016 | Taninaka et al. |
| 2022/0374084 | A1* | 11/2022 | Orita .................... G06F 3/0383 |
| 2023/0004225 | A1* | 1/2023 | Orita .................... G06F 3/0488 |

FOREIGN PATENT DOCUMENTS

| | | |
|---|---|---|
| EP | 2728445 A2 | 5/2014 |
| EP | 2733575 A1 | 5/2014 |
| EP | 3566115 B1 | 12/2021 |
| FR | 3072478 A1 | 4/2019 |
| FR | 3098323 B1 | 7/2021 |
| JP | 6739692 B1 | 7/2020 |
| WO | 2017/072232 A2 | 5/2017 |

OTHER PUBLICATIONS

International Search Report for International Application No. PCT/2021/079407, mailed Jan. 27, 2022, 5 pages with English translation.

International Written Opinion for International Application No. PCT/2021/079407, mailed Jan. 27, 2022, 9 pages with English machine translation.

Vezzoli et al., "Couplage vibration ultrasonique et èlectro-vibration pour la stimulation tactile" [in English: "Ultrasonic vibration and electro-vibration coupling for tactile stimulation" or "Coupling ultrasonic vibration and electro-vibration for tactile stimulation"], Electrical Engineering Symposium SGE (Jul. 2014) 8 pages with English machine translation.

* cited by examiner

THREE-DIMENSIONAL TOUCH INTERFACE PROVIDING HAPTIC FEEDBACK

CROSS-REFERENCE TO RELATED APPLICATIONS

This application is a national phase entry under 35 U.S.C. § 371 of International Patent Application PCT/EP2021/079407, filed Oct. 22, 2021, designating the United States of America and published as International Patent Publication WO 2022/090091 A1 on May 5, 2022, which claims the benefit under Article 8 of the Patent Cooperation Treaty to French Patent Application Serial No. FR2010956, filed Oct. 26, 2020.

TECHNICAL FIELD

The disclosure relates to a touch interface, with haptic feedback, comprising a three-dimensional control member, the control member being able to be touched by an external body, for example a finger of a user or a stylus manipulated by a user.

BACKGROUND

Conventional interfaces, intended for devices, be these industrial devices or devices intended for the general public, commonly use control members that are buttons, for example pushbuttons, control wheels or sliders. This type of member makes it possible to select and/or set operating parameters of the device that is controlled via the interface. The control members are generally three-dimensional and extend from a surface. The assembly forms a control bay. The control members may adopt various forms. They generally comprise moving parts, along with electrical interconnections. This results in a high manufacturing cost, and in wear after a certain period of use.

One alternative to this type of interface has appeared with the development of touch screens, in particular capacitive-effect touch screens. These are able to operate interactively and highly intuitively. They are nowadays used both for common devices, for example mobile telephones, or automobile dashboards, but also in more specialized industrial applications. However, a touch screen is a generally flat surface without any texturing.

Some devices have been developed that make it possible to feel a sensation of texture when a finger of a user is applied to a flat screen. The principles of such texturing are described, for example, in the publication Biet M. et al., "Squeeze film effect for the design of an ultrasonic tactile plate," IEEE Transactions on Ultrasonic, Ferroelectrics and Frequency Control, IEEE, 2007, 54 (12), pp. 2678-2688, or else in patent application EP1956466, as well as in the publication Vezzoli et al., "Couplage vibration ultrasonique et électro-vibration pour la stimulation tactile" [Ultrasonic vibration and electrovibration coupling for tactile stimulation], Electrical Engineering Symposium SGE 2014. In the latter, two tactile stimulation techniques are compared, including that using the so-called ultrasonic vibration effect. These documents describe a touch interface comprising a smooth plate, forming a contact surface intended to be touched by a finger. This plate is vibrated by multiple piezoelectric transducers arranged in contact with the plate, below the latter. The transducers and the plate form a resonator conducive to the formation of a standing bending wave, of the Lamb wave type. When the vibration resonant frequency of the contact surface is in the ultrasonic range, for example between 10 kHz and 200 kHz, and the amplitude of the vibration is low, typically a few microns, the user may feel a texturing effect of the contact surface when their finger slides along the surface. This effect is known and is usually denoted by the term "squeeze film" (or overpressure film). The vibration of the plate generates an air cushion between the finger and the plate, reducing the friction of the finger on the plate. This is also referred to as ultrasonic lubrication. By modulating the vibration, the friction of the finger on the plate is modified. The user may thus perceive an impression of texturing, taking the form of a feeling of roughness, or a certain resistance to sliding, while the contact surface remains smooth. This effect was applied to transparent or non-transparent contact surfaces, forming a haptic interface. This type of interface may be combined with a touch screen.

However, the presence of three-dimensional control members in an interface has certain advantages: better handling, operation that is sometimes considered to be more intuitive. Three-dimensional members are also suitable for uses in which the user's visibility is reduced, or when they cannot focus their full attention on the interface. For example, when the user is an automobile driver, the control interface for the equipment in the automobile must be as intuitive as possible, requiring the least amount of attention from the driver, so that the driver is able to concentrate on driving.

Document JP6739692 describes a haptic interface equipped with a three-dimensional control button. The three-dimensional control button is able to move in rotation on a plate. Under the effect of rotation of the control button, the haptic interface exerts haptic feedback, consisting in modulating a friction between the control button and the plate. This allows a user to perceive a modulation of the sliding of the control button on the plate.

The inventors have designed an interface of a device that combines the advantages of touch screens and conventional three-dimensional members.

BRIEF SUMMARY

A first subject of the disclosure is a touch interface, intended to control a device, the interface being intended to be touched by an external body, and comprising:
 a plate;
 at least one transducer, configured to vibrate the plate, preferably at an ultrasonic vibration frequency;
 the interface being characterized in that it comprises:
 a control member, extending from the plate, between a proximal end, applied against the plate, and a distal end, located at a distance from the plate, the control member being intended to be in contact with the external body;
 a sensor, configured to emit a state signal, the state signal being representative of contact of the external body on the control member;
 a control unit, connected to the sensor, and configured to send, on the basis of the state signal, an activation signal to at least one transducer, so as to vibrate the plate along with the control member.

The vibration thus brings about an impression of texturing, felt by the external body touching either the plate or the control member. The vibration then constitutes haptic feedback from the interface, resulting in a touch sensation being modified. The vibration is preferably an ultrasonic vibration. Ultrasonic vibration is understood to mean a vibration whose frequency is greater than or equal to 20 kHz. The vibration frequency is preferably less than 200 kHz.

The state signal may be representative of a pressure exerted by the external body on the control member and/or of a position of the external body on the control member.

The control unit may be configured to send a control signal to the device on the basis of the state signal.

The control member may be fixed against the plate. It may also be removable.

According to a first embodiment:
the sensor comprises a pressure sensor, configured to measure a pressure exerted, in particular under the effect of the external body, by the control member on the plate, the state signal comprising a pressure component, depending on the exerted pressure;
the control unit is configured to send an activation signal to the transducer on the basis of the exerted pressure, in particular when the pressure crosses a predetermined threshold or on the basis of a pressure variation.

The pressure sensor may comprise:
a rangefinder, arranged facing the plate, and configured to measure a distance separating it from the plate, the rangefinder being configured to determine a deformation of the plate under the effect of a pressure exerted on the plate;
or a strain gauge designed to deform under the effect of a deformation of the plate under the effect of a pressure exerted on the plate;
or a dynamometer, arranged in contact with the plate, and configured to detect a movement of the plate under the effect of a pressure exerted on the plate;
or a transducer, configured to measure a variation in a vibration of the plate, the variation resulting from a pressure exerted on the plate.

Depending on the pressure component measured by the pressure sensor, the control unit may be configured to send an activation signal that takes the form of an activation sequence. The activation sequence is parameterized such that a clicking effect is felt by the external body, the click forming haptic feedback from the interface.

The activation signal may be established from:
a periodic carrier, the carrier extending, in each period, over an amplitude;
a modulation function, varying on the basis of the pressure component measured by the position sensor;
such that the amplitude of the activation signal results from a modulation of the carrier by the modulation function.

According to a second embodiment:
the sensor comprises a capacitive position sensor, connected to a network of conductive tracks preferably extending parallel to the plate;
the control member is formed of an electrically insulating material, and comprises conductive elements, electrically insulated from one another, extending between the proximal end and the distal end;
at least one conductive track is arranged in capacitive contact with at least one conductive element of the control member, so as to allow a charge transfer, through a capacitive effect, between the external body and the conductive track, by way of the conductive element;
such that the state signal comprises a position component, depending on a position of the contact between the external body and the control member.

The control unit may be configured to send the activation signal to the transducer when the position component undergoes a variation representative of a variation in the position of the contact between the external body and the control member.

Depending on the position component measured by the position sensor, the activation signal may be parameterized such that a notch effect is felt by the external body, the notch effect forming haptic feedback from the interface. The notch effect corresponds to the external body feeling at least one virtual notch on the control member. The virtual notch is a notch that is felt, resulting from the vibration of the plate by the activation signal.

The activation signal may be established from:
a periodic carrier, the carrier extending, in each period, over an amplitude;
a modulation function, varying on the basis of the position component;
such that the amplitude of the activation signal results from a modulation of the carrier by the modulation function.

The modulation function may successively comprise:
an anterior phase, when the external body approaches a notch;
a notch phase, when the external body crosses the notch;
a posterior phase, when the external body moves away from the notch;
such that the feeling of the virtual notch by the user depends on the modulation function during the anterior, notch and posterior phases.

The modulation function may be such that, in the notch phase, the modulation function varies over a wider range of variation than in the anterior phase and in the posterior phase.

The anterior, notch and posterior phases form an activation sequence associated with the virtual notch. The activation signal may comprise multiple successive activation sequences, each activation sequence corresponding to a virtual notch.

In the notch phase, the modulation function may be such that an absolute value of its time derivative reaches a higher maximum value than in the anterior phase and in the posterior phase.

The haptic feedback from the interface may be likened to a virtual texture, insofar as it is a texture that is felt, independently of the real surface state of the control member.

The first embodiment and the second embodiment may be considered independently of one another or in combination.

According to one possibility, the control member does not comprise any component that is mobile with respect to the plate.

The control member preferably has the geometric shape of a button or a control wheel or a slider.

The plate is preferably connected to a plurality of transducers. The plate may be rigid, transparent or opaque. According to one possibility, the interface comprises a screen. The plate may then be transparent, and placed against or parallel to the screen.

A second subject of the disclosure is a device, able to be controlled by a parameter, and comprising an interface configured to select the parameter or set a value of the parameter, the device being characterized in that the interface is an interface in accordance with the first subject of the disclosure, the interface being configured to determine the value of the parameter or to select the parameter on the basis of the state signal.

A third subject of the disclosure is a method for controlling an interface according to the first subject of the disclosure, comprising:

a) applying an external body to the control member;

b) the sensor forming a state signal, representative of a position of the external body on the control member and/or of a pressure exerted by the control member on the plate, under the effect of the external body;

c) the control unit emitting, on the basis of the state signal, an activation signal for the transducer or for each transducer;

d) under the effect of the activation signal, vibrating the plate, such that a preferably ultrasonic vibration propagates through the plate, so as to bring about a haptic effect on the external body.

The effect of the ultrasonic vibration on the external body thus constitutes haptic feedback from the interface.

The interface may be as described in connection with the first embodiment of the first subject of the disclosure. The method may then be such that:

in step a), the external body applies a pressure on the control member, in the direction of the plate;

in step b), the state signal formed by the sensor is representative of the pressure exerted by the external body on the control member;

in step c), the control unit emits an activation signal on the basis of the pressure and/or of a variation in the pressure.

The activation signal may be as described in connection with the first embodiment of the first subject of the disclosure.

The interface may be as described in connection with the second embodiment of the first subject of the disclosure.

The method may then be such that:

in step a), the external body is electrically conductive and moves on the control member, facing various conductive elements;

in step b), the state signal formed by the sensor is representative of a variation in the position of the external body on the control member;

in step c), the control unit emits an activation signal on the basis of the variation in the position of the external body.

The activation signal may be as described in connection with the second embodiment of the first subject of the disclosure. The activation signal may take the form of an activation sequence, or of multiple successive activation sequences. The activation sequence, or each activation sequence, may be parameterized such that a notch effect is felt by the external body, the notch effect forming haptic feedback from the interface.

The method may also be such that:

in step a), the external body is electrically conductive and the control member is capable of being contacted, simultaneously, at various points of contact, respectively on various conductive elements;

in step b), the state signal formed by the sensor is representative of a number of points of contact;

in step c), the control unit emits an activation signal on the basis of a variation in the number of points of contact.

The method may comprise a step e) in which the control unit sends a control signal to the device on the basis of the state signal formed by the sensor.

The external body may be a finger of a user.

The disclosure will be better understood on reading the description of the exemplary embodiments that are presented, in the rest of the description, with reference to the figures listed below.

DETAILED DESCRIPTION

Figure 1A:
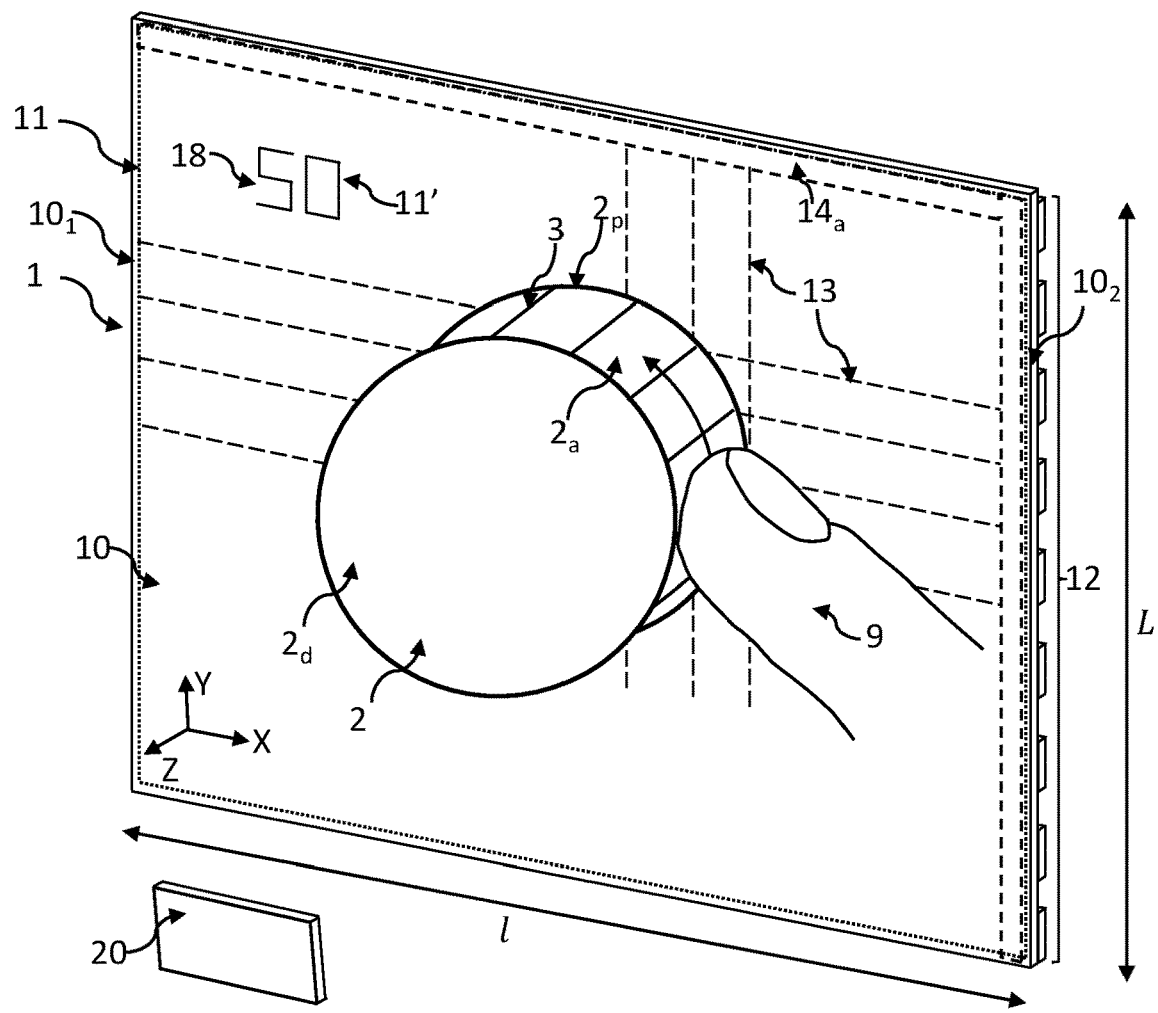
FIGS. 1A and 1B show one example of a touch interface with an appearance similar to a control wheel.
Figure 1B:
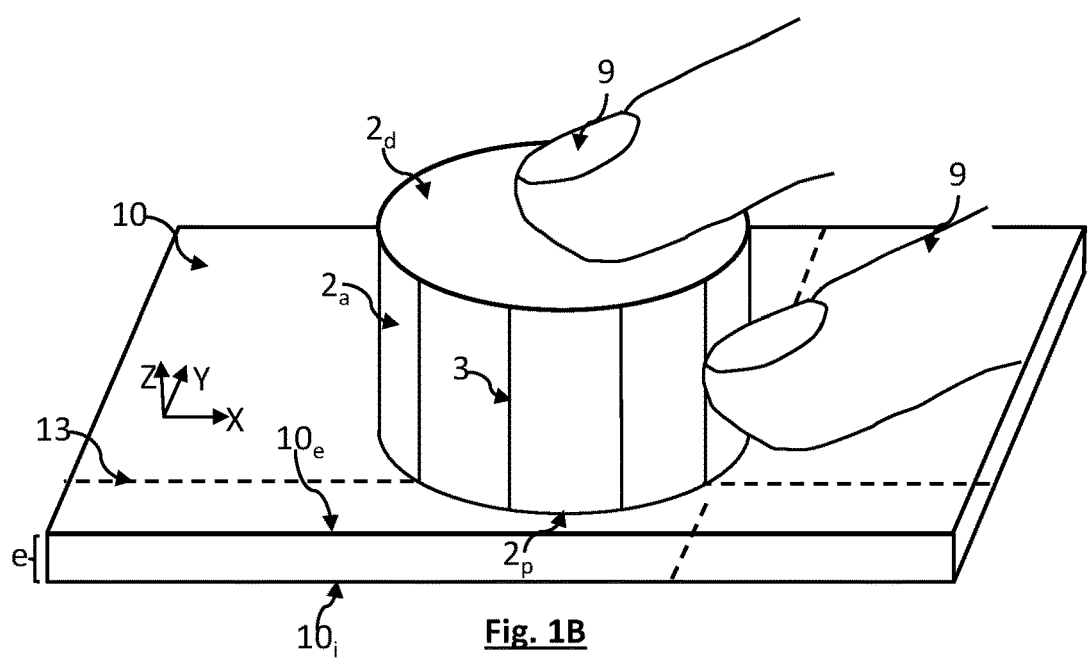

FIGS. 1A and 1B show a first example of a touch interface 1 according to embodiments of the disclosure. The touch interface is intended to be actuated by an external body 9 so as to control a device 20. The device may be a processor of a household appliance, or of equipment in an automobile, or any other equipment for consumer or professional use. The device 20 is connected to the interface by a wired or wireless link.

In the examples shown in this disclosure, the external body 9 is a finger, which is consistent with most of the applications envisaged. As an alternative, the external body 9 may be a stylus, or any other means for acting on the interface 1. The term "touch interface" denotes an interface configured to be touched by such an external body 9.

The touch interface comprises a rigid plate 10 that is able to be vibrated. The plate 10 extends between an outer face $10_e$ and an inner face $10_i$. The outer face $10_e$ is accessible to the finger 9. The inner face $10_i$ and the outer face $10_e$ preferably extend parallel to one another. The distance between the outer face $10_e$ and the inner face $10_i$ defines a thickness e of the plate. The thickness e of the plate is dimensioned to allow vibration of the plate 10 according to an ultrasonic vibration, as described below. The thickness e of the plate 10 is preferably less than 10 mm, or even less than 5 mm. The thickness e is adjusted on the basis of the nature of the material and its mechanical properties (rigidity, solidity). It is, for example, between 1 mm and 5 mm for glass or a material such as Plexiglas.

In the example shown, the inner face $10_i$ and the outer face $10_e$ are flat, which is consistent with the simplest configuration to manufacture. The plate extends, parallel to a lateral axis X, over a width/and, parallel to a longitudinal axis Y, over a length L. The length L and the width/may be between 5 cm and a few tens of cm, for example 30 cm, or even more. The lateral axis X and the longitudinal axis Y define a main plane PXY. In other examples, the inner face $10_i$ and/or the outer face $10_e$ may be curved.

The plate 10 is formed from a rigid material, such as glass, or a polymer, or wood, or a metal, or a semiconductor, for example silicon. The plate 10 may be transparent or opaque. The plate 10 may comprise opaque parts and transparent parts. The plate may comprise multiple layers stacked on one another.

In this example, the plate 10 is delimited over the lateral axis X by a first side edge $10i$ and a second side edge 102, in the vicinity of which transducers 12 are arranged. In the vicinity is understood to mean at a distance of preferably less than 2 cm, on or under the plate 10. Each transducer 12 is able to be activated by an electrical activation signal, and, under the effect of the activation signal, to exert pressure on the plate 10 so as to produce local deformation of the plate, in a direction perpendicular to the plate. When the activation signal is periodic, at an ultrasonic frequency, the deformation of the plate 10 is periodic, thereby leading to formation of an ultrasonic vibration 19 propagating through the plate. The vibration may, in particular, be produced by a bending wave propagating through the plate. The bending wave may be a standing wave or a progressive wave. Therefore, the activation signal for each transducer may be time-modulated and/or amplitude-modulated. Preferably, the plate is connected to a plurality of transducers 12. The transducers are generally arranged in the vicinity of at least one edge of the plate 10, and preferably in the vicinity of two opposite edges relative to the lateral axis X and/or the lateral axis Y. The arrangement of the transducers 12 at the edge of the plate 10 is not a necessary condition: the transducers may be arranged in other configurations, for example in the form of a row, in the middle of the plate, or of a matrix.

Each transducer 12 may be a piezoelectric transducer comprising a piezoelectric material, for example AlN, ZnO or PZT, arranged between two electrodes. For example, each transducer 12 may be the PZT reference 406. As an alternative, each transducer may be an electromechanical resonator, for example of MEMS (MicroElectroMechanical System—electromechanical microresonator) type, or of electrostrictive or magnetostrictive type. The transducers 12 may be such that the piezoelectric material is deposited, in the form of one or more thin layers, in contact with bias electrodes.

Each transducer 12 may be joined to the inner face $10_i$ of the plate 10 by adhesive bonding. The transducers are connected mechanically to the inner face $10_i$: they may be joined to the inner face directly, or may be joined to an intermediate, preferably rigid, component, the latter being joined to the inner face $10_i$ so as to allow transmission, to the plate, of the vibration brought about by the or each transducer.

The intermediate component may be metallic. It may, for example, be a part forming an amplifier, arranged between the plate and a transducer 12 (or each transducer 12), and designed to amplify the vibration produced by the transducer 12 (or each transducer 12) and transmitted to the plate 10. The intermediate component may form a rigid layer so as to increase the rigidity of the plate. The intermediate component may be a screen 11, joined to the plate 10, as described below. The plate 10 may form a protection panel for the screen 11. The screen 11 may be an LCD (Liquid Crystal Display) or OLED (Organic Light-Emitting Diode) screen. The intermediate component may be a multilayer component. It may, for example, comprise a screen under which there is placed a part forming an amplifier, the transducers being joined to the amplifier.

Figure 1C:
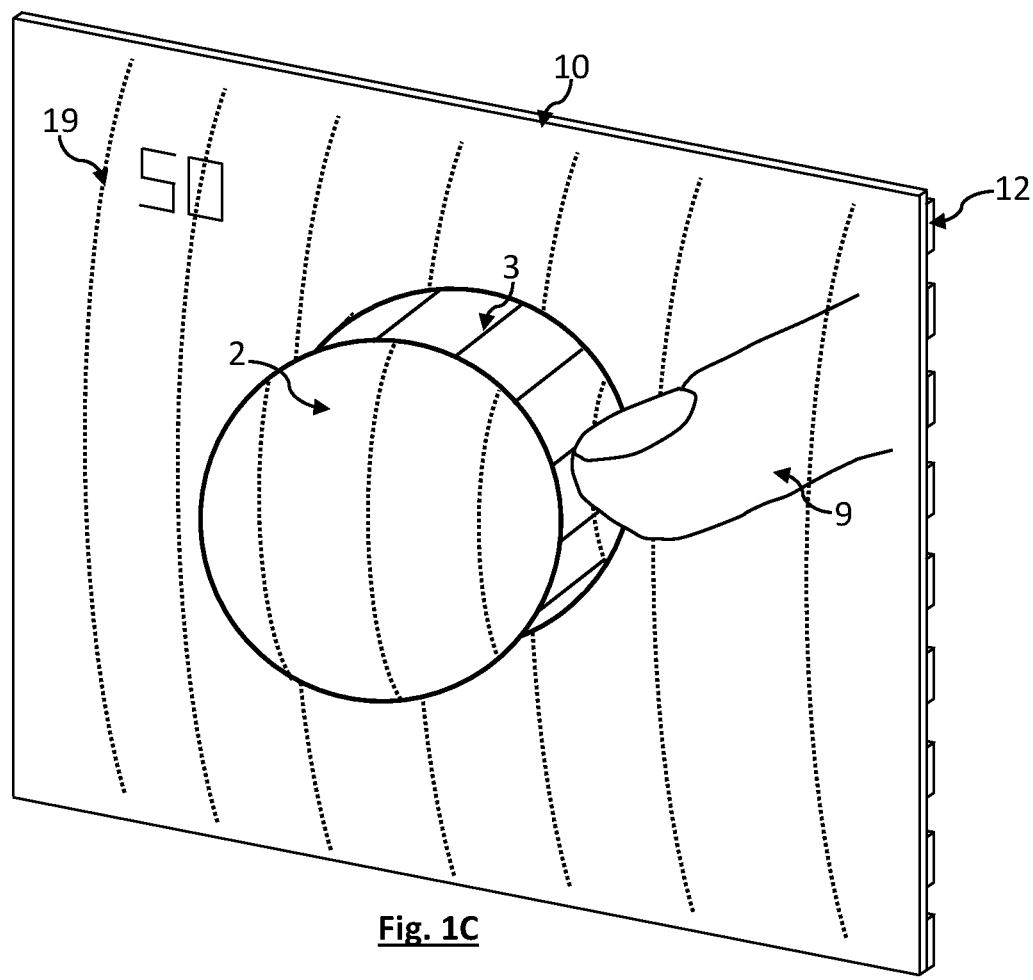
FIG. 1C schematically shows propagation of an ultrasonic vibration through the interface described in connection with FIGS. 1A and 1B.

Generally speaking, each transducer 12 is configured to generate an ultrasonic vibration 19, the latter propagating in the plate 10. The frequency of the ultrasonic vibration 19 is preferably between 10 kHz and 200 kHz. It is preferably greater than 20 kHz so as to relate to the ultrasonic spectral band, and preferably less than 150 kHz. The amplitude of the ultrasonic vibration 19 is generally between 0.1 μm and 50 μm. FIG. 1C has schematically shown an ultrasonic vibration 19 propagating in the plate 10. As is known in the field of haptic feedback interfaces, the vibration of the plate leads to the formation of a thin film of air between the plate 10 and the finger 9 (known as the "squeeze film effect"), thereby leading to a modification of the contact surface between the finger and the plate. Modulating the amplitude of the vibration of the plate varies the thickness of the film of air. This modifies the friction between the plate and the finger, as described in the prior art, thereby leading to an impression of texturing of the plate when the user's finger moves on the outer face $10_e$. The ultrasonic vibration 19 may be stationary, but it need not be.

The inventors have arranged a rigid, three-dimensional control member 2 on the plate 10, and more precisely on the outer face $10_e$ of the plate. They found that an ultrasonic vibration 19, propagating in the plate 10, may also propagate in the control member 2, in particular when it is possible to preserve the vertical movement of the plate, without significant damping. The ultrasonic vibration 19 may then be felt indirectly by the finger 9, when the finger touches the control member 2. This is an important element of the disclosure, according to which a haptic effect may be felt not only in contact with the plate 10, but also in contact with a control member 2, which is preferably rigid and connected to the plate 10. The fact that the vibration frequency is ultrasonic makes the vibration imperceptible, except to the external body 9 moving on the outer face of the plate or on the control member 2.

The control member 2 may be fixed on the plate 10. It may also be placed temporarily on the plate 10, being removable. In all cases, the control member remains fixed during operation thereof, that is to say during actuation thereof by an external body.

The control member 2 may take the form of a conventional control member, as described in the prior art: control wheel, button or slider. However, unlike standard control members, the control member 2 may be a simple, inert element without any moving or electronic parts. It may be obtained, for example, through a simple manufacturing process, for example molding.

Generally speaking, the control member 2 extends between a proximal end $2_p$, in contact with the plate 10, and a distal end $2_d$, located at an extension distance from the plate. The extension distance corresponds to a distance, along a transverse axis Z, perpendicular to the plate 10, between the plate and the distal end $2_d$. It is typically equal to a few millimeters or centimeters. The control member 2 comprises a side face $2_a$, connecting the proximal end $2_p$ to the distal end $2_a$. The finger 9 may contact the control member 2 either at the distal end $2_d$ (cf. FIG. 1B) or at the side face $2_a$ (cf. FIGS. 1A, 1B, 1C and 1E).

The finger 9 may also contact the control member on its edges (for example, at the junction between the side face $2_a$ and the proximal end $2_p$), or on an inner face when the control member is hollow, for example in the case of a ring. In the example shown in FIG. 1A, the distal end 2d is two-dimensional, and extends along a flat surface parallel to the outer face 10e of the plate 10. The distal end 2d may constitute a support surface for the control member 2.

The fact that the control member 2 extends in three dimensions improves the gripping thereof by one or more fingers 9. A finger 9 may slide easily along the side face $2_a$(also referred to herein as the "side surface"$2_a$), or press the distal end $2_d$ in the direction of the plate 10. The three-dimensional surface of the control member 2 also makes it possible to increase a contact surface of the interface. It will be understood that the three-dimensional control member 2 makes it possible to obtain an interface 1 with improved ergonomics compared to a flat interface.

In the example shown in FIGS. 1A to 1C and 1E, the control member 2 has a cylindrical shape, similar to the shape of a wheel. According to other configurations, the control member may have other shapes, for example a parallelepiped, a cone, a frustoconical shape, or a hemispherical shape. Examples of parallelepipedal or frustoconical shapes are commented on below, in connection with FIGS. 4B to 4D. The control member 2 is rigid. It may be joined to the outer face $10_e$ of the plate 10 by adhesive bonding.

The interface 1 comprises a sensor 14, making it possible to form a signal S(t), called a state signal, depending on a state of the contact between the finger 9 and the control member 2, at a time t. A state of the contact is understood to mean:
- a position of the contact on the control member 2, and/or a variation in the position; and/or
- a pressure exerted by the finger 9 on the plate 10, by way of the control member 2, and/or a variation in the pressure.

The sensor 14 may comprise a position sensor $14_a$. The function of the position sensor $14_a$ is that of determining a position of contact of the finger 9, parallel to the outer face $10_e$. In the example shown in FIGS. 1A and 1B, the plate 10 is formed of a dielectric material, and the position sensor $14_a$ is a capacitive sensor. It is connected to conductive tracks 13, arranged in a two-dimensional network. The conductive tracks 13 are adjacent to the inner face $10_i$. The conductive tracks extend parallel to the plate 10, below the outer face $10_e$. In the example shown, the conductive tracks are formed on a capacitive screen 11 and arranged adjacent to the inner face $10_i$.

When the plate 10 is opaque, the conductive tracks 13 may be made from a common conductive material, for example a metal. When the plate 10 is transparent, the conductive tracks 13 are preferably made from a transparent conductive material, for example a conductive oxide, a common material being ITO (Indium-Tin Oxide). The network formed by the conductive tracks 13 may be of matrix type, the tracks being rectilinear and extending in rows and columns. The conductive tracks may be biased in line with a bias voltage.

The conductive tracks 13 may be formed directly on the plate 10 or in the plate 10.

The control member 2 may comprise or be formed by a dielectric material, for example a plastic. It may comprise conductive elements 3, for example made of metal and preferably rectilinear, extending from the proximal end $2_p$, toward the distal end $2_d$, along the side surface $2_a$. The various conductive elements 3 are electrically insulated from one another. Such a control member 2 may be structured as described in patent application FR1907542 filed on Jul. 5, 2019. At the proximal end $2_p$, each conductive element 3 is arranged so as to be positioned facing a conductive track 13, while being separated therefrom by a small thickness of dielectric material formed by the plate. Capacitive coupling may then be established between the conductive track 13 and the conductive element 3.

With the finger 9 being electrically conductive, under the effect of proximity with a conductive element 3, a charge transfer may be carried out, through a capacitive effect, between one or more conductive tracks 13 and the finger 9, by way of the capacitive coupling taking place between the conductive element 3 and the one or more conductive tracks 13. The finger 9 may be in direct electrical contact with a conductive element 3. It may also be in capacitive coupling with a conductive element 3, for example when the conductive element 3 is covered with a thin dielectric layer, for example a varnish. It should be noted that detection based on capacitive coupling assumes that the control member 2 is touched by an electrically conductive body 9: finger or conductive stylus, for example made of metal.

FIGS. 1A and 1B show the conductive tracks 13 by way of dashes because they are located behind the plate 10.

The conductive tracks 13 are connected to the position sensor $14a$. The position sensor is configured to estimate a position, parallel to the plate 10, of a point of capacitive contact between the finger 9 and the conductive tracks 13. Due to the two-dimensional arrangement of the conductive tracks 13, the position sensor $14_a$ makes it possible to obtain two-dimensional coordinates (x,y) for the point of contact, parallel to the plate 10. The position sensor $14_a$ also makes it possible to estimate a variation in the point of contact, this being detected:
- upon movement of the finger 9 with respect to the control member 2: this is then a spatial variation in the position of the point of contact;
- upon application or removal of a finger 9 to or from the control member 2: this is then a temporal variation in the position of the point of contact.

In a manner known in the field of capacitive detection, the conductive tracks 13 and the conductive elements 3 advantageously define a mesh, such that the presence of a finger 9 is detected simultaneously by multiple conductive tracks 13. The finger is thus placed in contact or in capacitive coupling with at least two adjacent conductive elements 3. This makes it possible to obtain a determination of the position of the finger, parallel to the plate 10, with a high spatial resolution.

A part 11' of a screen 11 located against the inner face $10_i$ of the plate 10 has been shown in FIG. 1A. In this example, the screen 11 makes it possible to display a parameter 18 on the part 11', the value of the parameter being adjusted by the finger 9 acting on the control member 2, as described below.

Figure 2A:
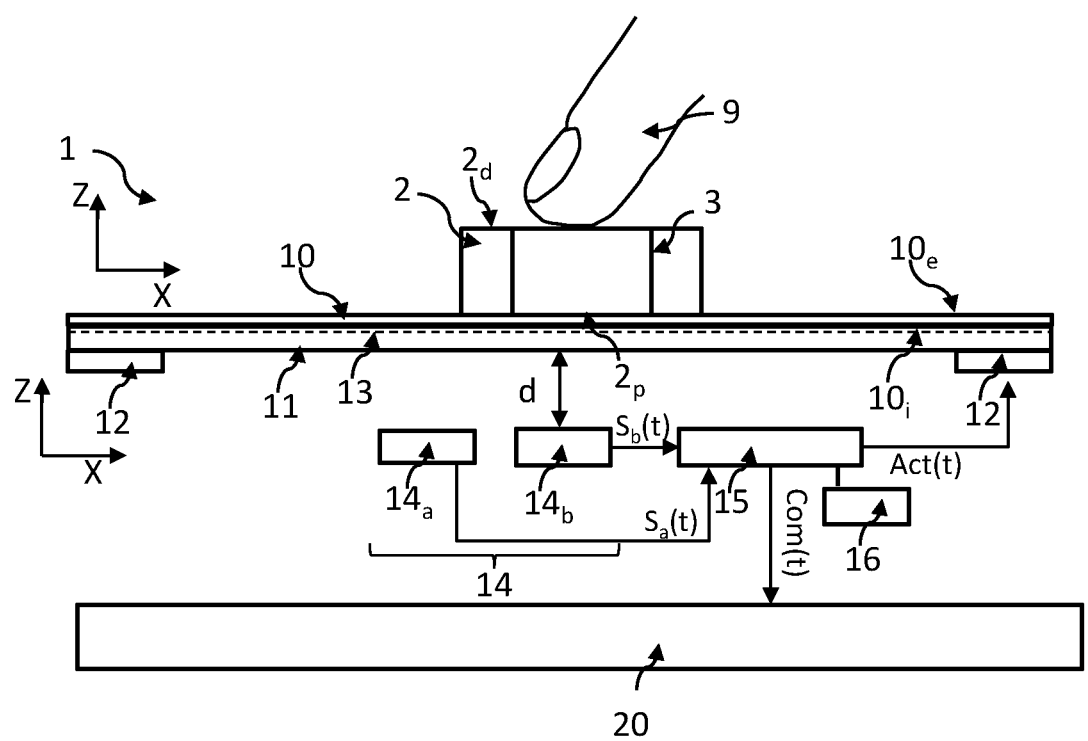
FIGS. 2A to 2E show various configurations of the interface, the interface comprising features described in connection with FIGS. 1A to 1I.

FIG. 2A shows a view, in a plane PXZ, of the main elements forming the interface 1. In the example shown in FIG. 2A, the sensor 14 comprises, in addition to the position sensor $14_a$, a pressure sensor $14_b$. The pressure sensor $14_b$ is configured to measure a pressure exerted on the plate 10, and resulting in a deformation of the plate. A finger 9 pressing on the control member 2, toward the plate 10, has been shown in the example shown in FIG. 2A. The pressure exerted by the finger 9 is transmitted, by the control member 2, to the plate 10. Under the effect of the pressure, the plate 10 undergoes a deformation, and bends toward the pressure sensor $14_b$. In the example shown in FIG. 2A, the capacitive screen 11 is pressed against the inner face $10_i$ of the plate 10. Under the effect of the pressure exerted on the plate 10, the assembly formed by the plate 10 and the screen 11 deforms.

The pressure sensor $14_b$ may comprise a rangefinder, configured to measure a variation in distance separating it from the plate 10. The detection range of the rangefinder is then adapted to short distances, and to small distance variations. It may, for example, be an infrared optical rangefinder, the operating range of which is between 1 and 5 mm, and positioned 2.5 mm from the plate. Such a rangefinder is commonly referred to as a "reflective object sensor." For example, the reference sensor QRE 1113 is suitable for such an application.

Figure 2B:
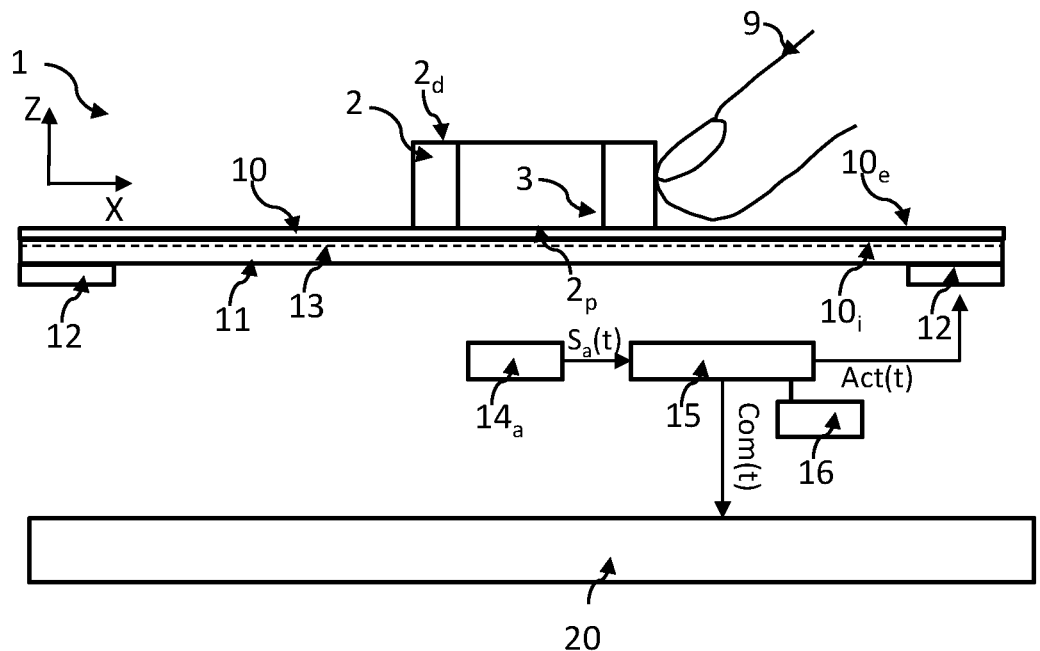

In FIG. 2B, the interface comprises a position sensor $14_a$, but not a pressure sensor $14_b$.

Figure 2C:
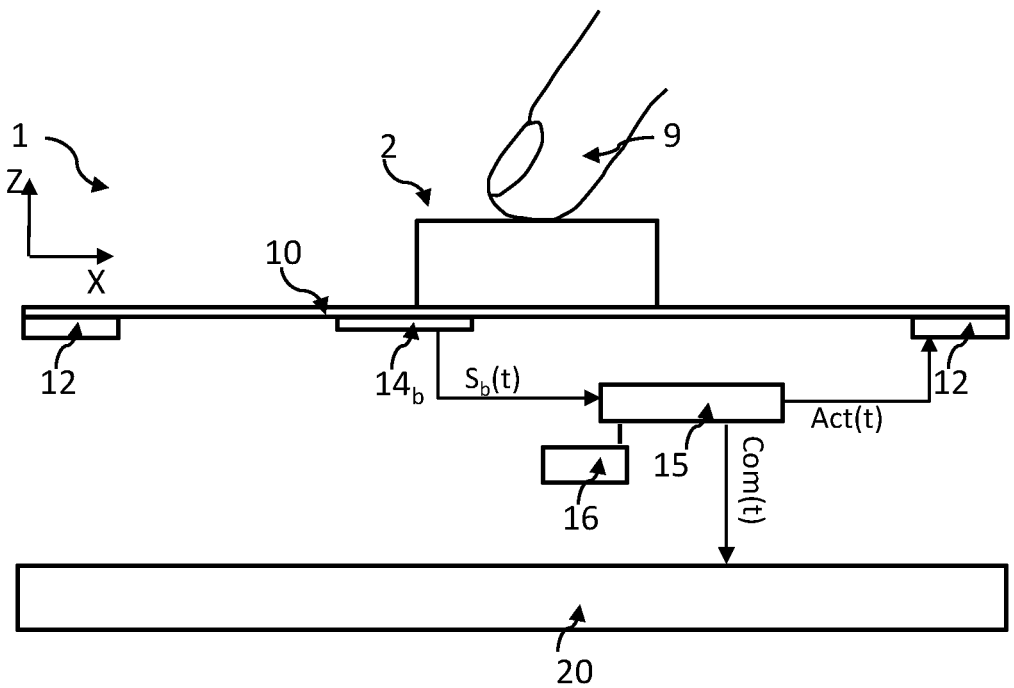

As an alternative to a rangefinder, the pressure sensor $14_b$ may be a strain gauge, placed in contact with the plate 10, or with the assembly formed by the plate 10 and the screen 11. The strain gauge makes it possible to quantify the deformation of the plate. FIG. 2C shows one such configuration. It should be noted that, in the configuration shown in FIG. 2C, the sensor 14 does not comprise a position sensor $14_a$.

Another alternative is that of using a dynamometric sensor, placed in contact with the plate 10, and allowing measurement of the pressure applied by the plate. However, for reasons of ease of design, the use of a rangefinder sensor is preferred. This makes it possible to perform a contactless measurement of the deformation experienced by the plate 10.

Figure 2D:
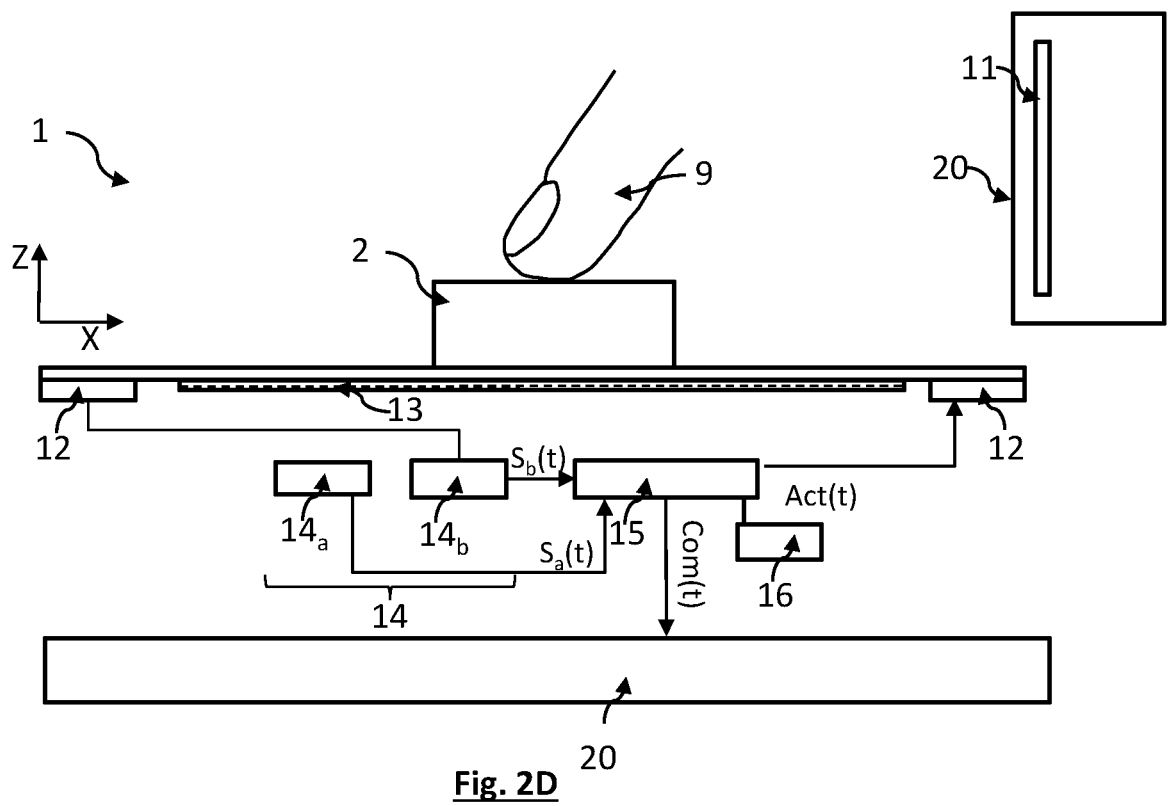
Figure 2E:
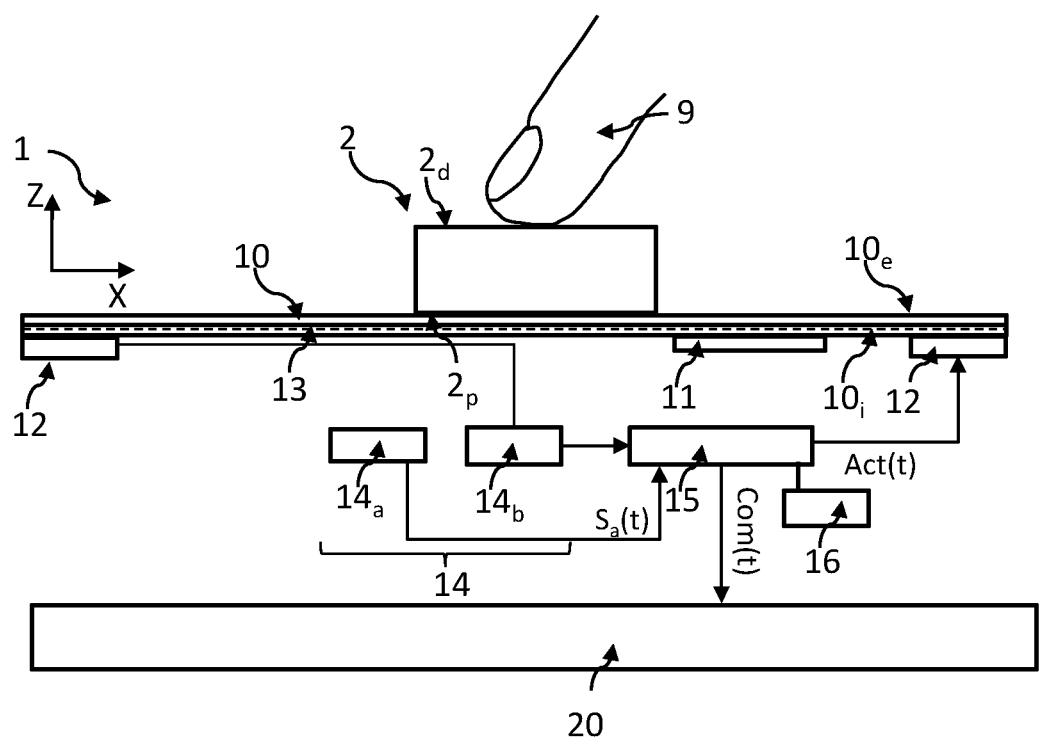

According to another alternative, the pressure sensor $14_b$ is as described in patent application EP3566115. The pressure sensor $14_b$ acts while the plate 10 is vibrated by at least one piezoelectric transducer 12. The pressure exerted on the plate 10 is estimated by measuring a variation in a vibration amplitude under the effect of the pressure. The variation in the vibration amplitude may be measured by one or more transducers 12. Based on the variation measurements resulting from the transducers 12, the pressure sensor $14_b$ determines the pressure applied to the plate 10. In such a configuration, the pressure sensor $14_b$ is connected to transducers 12, as shown in FIGS. 2D and 2E.

The interface also comprises a control unit 15, connected to the sensor 14, the sensor comprising the position sensor $14_a$ and/or the pressure sensor $14_b$. The sensor 14 sends a state signal S(t) to the control unit 15. The state signal comprises:
- a position component Sa(t), from the position sensor $14_a$, representative of a position of the finger, or of multiple fingers, on the control member 2;
- and/or a pressure component Sb(t), from the pressure sensor 14b, representative of a pressure exerted by the finger, on the control member 2, toward the plate 10.

The state signal S(t) is updated at each time t, at a measurement frequency that may, for example, be between a few tens of Hz and a few hundred kHz.

The control unit 15 comprises a microcontroller or a microprocessor. The control unit 15 is parameterized or programmed to perform the actions described below. On the basis of the state signal S(t) transmitted by the sensor 14, the control unit 15 may send a control signal Com(t) to the device 20. For example, when the interface 1 is used to define a value of an operating parameter 18 of the device 20, the control unit 15 is configured to transmit the value of the parameter to the device.

One important aspect of the disclosure is that the control unit 15 is configured to send an activation signal Act(t) to at least one transducer 12, and preferably to each transducer 12, on the basis of the state signal S(t). The desired aim is to obtain haptic feedback from the interface 1, sent to the user. Under the effect of the activation signal, each activated transducer generates an ultrasonic vibration 19, propagating through the plate 10 and through the control member 2, to the user's finger 9, as shown in FIG. 1C.

Figure 1D:
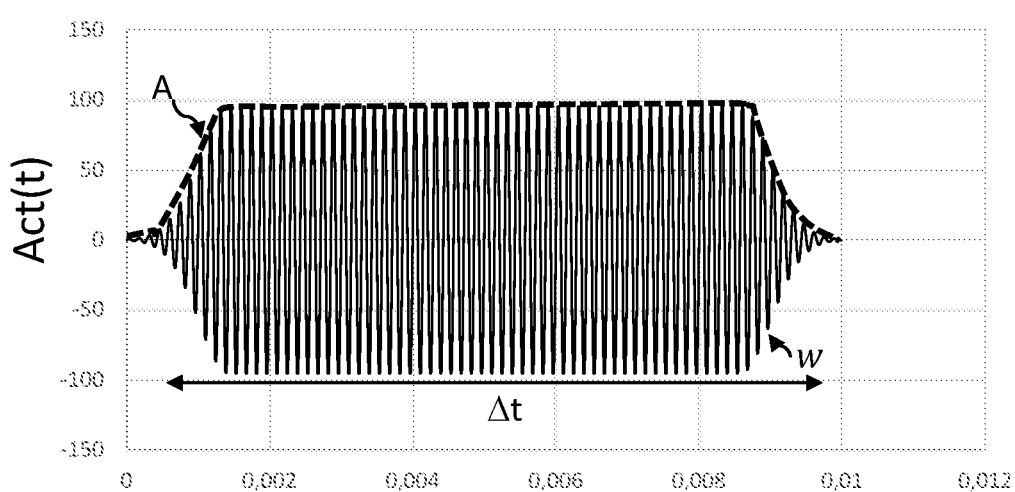
FIG. 1D illustrates a temporal sequence of activation of transducers, leading to vibration of the plate so as to bring about a clicking effect.

FIG. 1D illustrates a modulation of the amplitude of the ultrasonic vibration 19 as a function of time, under the effect of the activation of the piezoelectric transducers. FIG. 1D corresponds to generation of a clicking effect. A clicking effect is understood to mean an effect via which the finger, in contact with the control member 2, perceives a haptic clicking sensation, comparable to a click performed by acting on a conventional control button, for example by depressing it or by releasing it. This effect may be obtained by subjecting all or some of the transducers 12 to an activation sequence as shown in FIG. 1D. An activation sequence is understood to mean generation of the activation signal Act(t) for a time period Δt, allowing the plate 10 to be vibrated. In this example, the activation sequence extends over a duration Δt=10 ms. According to other examples, it may last between a few ms, for example 5 ms, and a few hundred ms. The activation of the transducers 12 leads to ultrasonic vibration of the plate 10 at an amplitude that may, for example, be equal to 2 μm peak-to-peak. In FIG. 1D, the abscissa axis corresponds to time (unit in seconds), while the ordinate axis corresponds to the amplitude of the activation signal Act(t) sent to the transducers 12. The unit of the ordinate axis in FIG. 1D is in picometers: this represents the amplitude of the deformation of the plate. An activation sequence corresponding to a click may be parameterized by the duration Δt, along with the amplitude or the frequency of the activation signal. Varying one of these parameters makes it possible to vary the clicking effect that is felt. The control unit 15 may thus generate various activation sequences, each activation sequence corresponding to a particular clicking feeling. According to one variant, the clicking effect may be produced as described in patent application FR1909660 filed on Sep. 3, 2019. The activation sequence or sequences may be recorded in a memory 16 connected to the control unit 15.

In the activation sequence shown in FIG. 1D, the activation signal Act(t) is formed by a periodic, amplitude-modulated, so-called "carrier" signal w. The period of the carrier signal w preferably corresponds to an ultrasonic frequency, that is to say between 20 kHz and 200 kHz. In this example, the carrier w is sinusoidal. The activation signal is formed by an amplitude modulation of the carrier, by a modulation function A. In the example shown in FIG. 1D, the modulation function A is first increasing, then constant, then decreasing. The activation signal is such that:

$$ct(t) = A(t) \times w(t) \qquad (1)$$

During the modulation of the carrier, the modulation function A adopts a predetermined temporal form: it may be a simple gate function, or trapezoidal, or Gaussian, or triangular, or another type of periodic function.

According to another embodiment, the finger 9 perceives a notch effect when it slides along the control member 2. Virtual notches C along the side surface $2_a$ of the control member 2 have been shown in FIG. 1E. The notches C are virtual: they do not correspond to a real texturing or a surface state of the control member 2. They are notches that are felt by the finger sliding along the surface $2_a$, under the effect of vibration of the plate and of the control member. For example, the surface of the control member is smooth and the finger, sliding on the control member, perceives virtual texturing corresponding to notches that are spaced from one another. A notch effect is understood to mean an effect by which the finger, when sliding along the control member 2, feels a haptic notch sensation comparable to the passing of mechanical notches perceived when rotating a control wheel. In other words, this involves mimicking a notch sensation that the finger would perceive if it were to act on a notched mechanical slider. This results in an almost instantaneous variation in the speed of the finger when it moves over each notch. The variation in the speed of the finger corresponds to an acceleration or a deceleration. The variation in speed is brought about by a variation in the friction of the finger sliding along the interface. The variation in friction is obtained by vibrating the plate, as detailed below.

In the same way as the clicking effect, the activation signal is obtained through amplitude modulation of a periodic carrier w. The amplitude modulation is performed by an amplitude modulation function. Unlike an activation sequence corresponding to a click, the amplitude modulation function is periodic when it is desired to obtain a feeling of multiple successive notches.

Figure 1E:
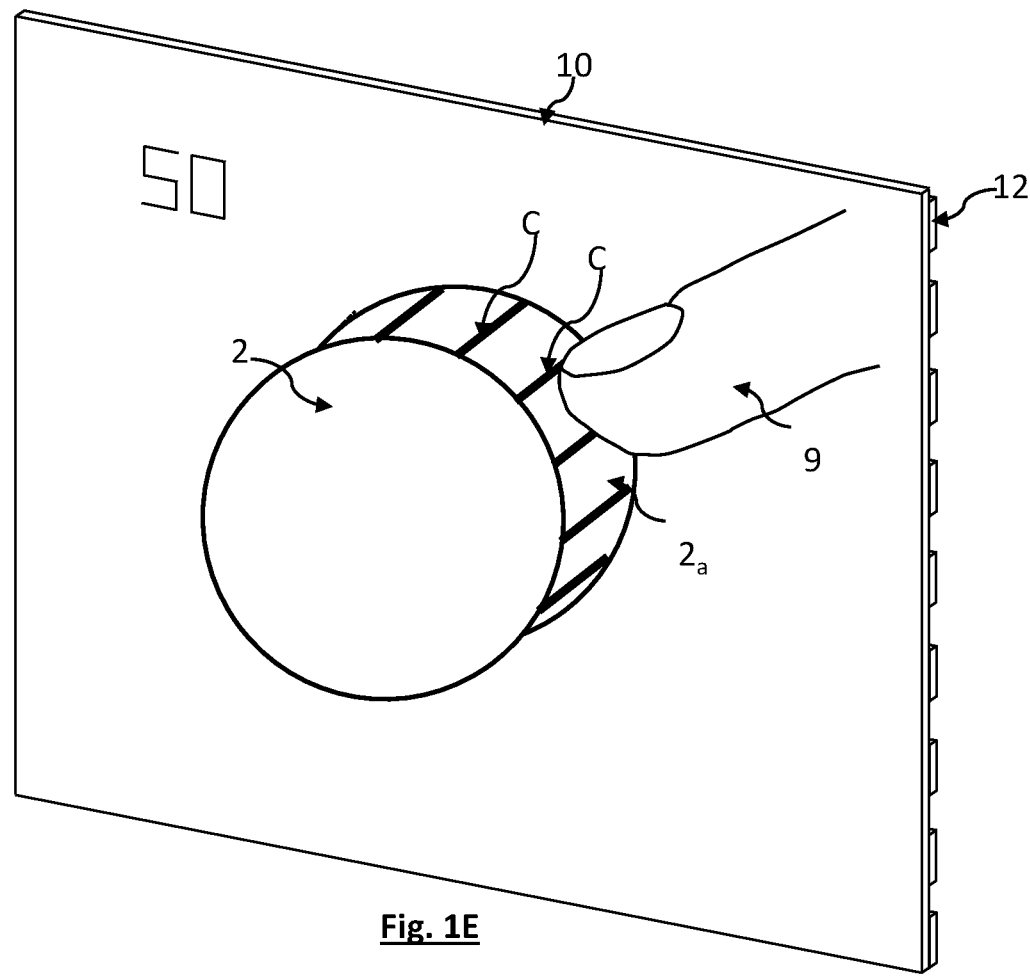
FIG. 1E schematically shows a movement of a finger along a control member. During the movement, under the effect of vibration of the plate, the finger feels the presence of virtual notches on the surface of the control member.
Figure 1F:
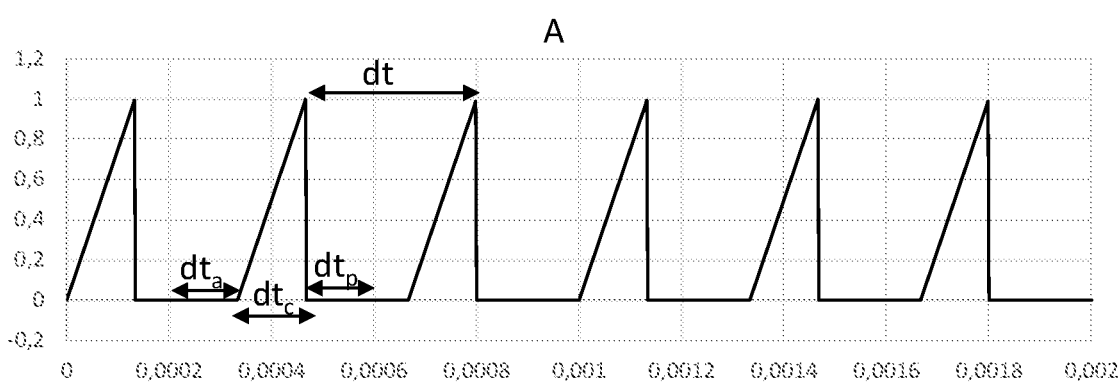
FIGS. 1F, 1G and 1H illustrate a modulation function, a carrier and a signal for activating the plate, resulting from an amplitude modulation of the carrier by the modulation function, respectively. The activation signal allows virtual notches shown in FIG. 1E to be felt.
Figure 1G:
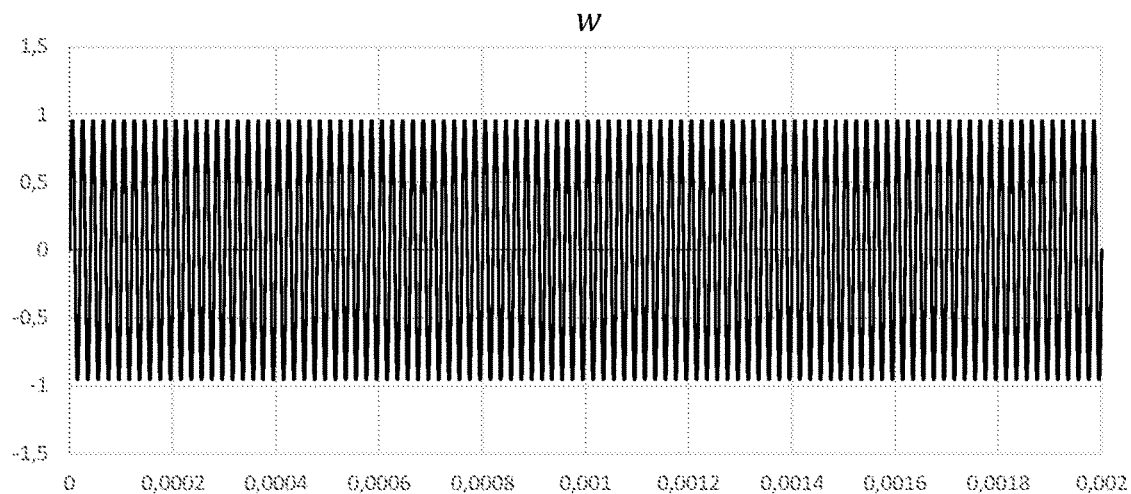
Figure 1H:
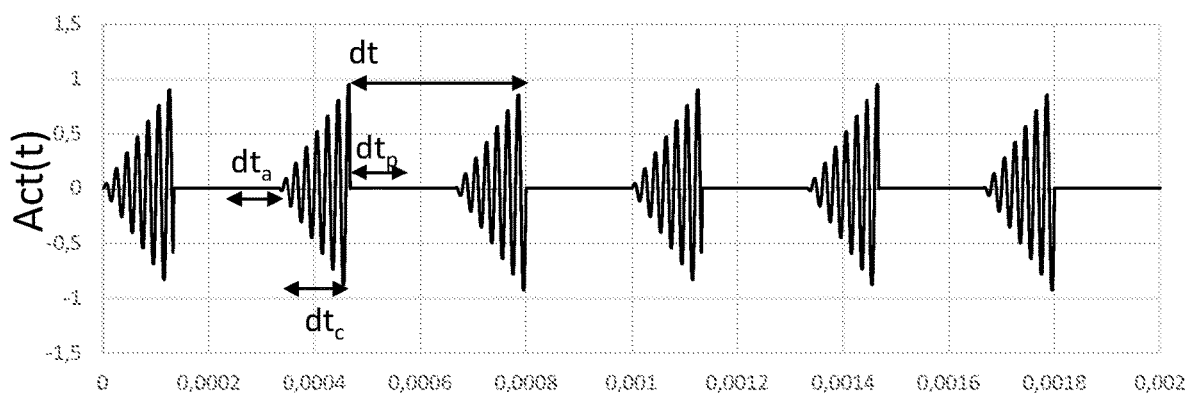

According to a first possibility, which is shown in FIGS. 1F to 1H, the modulation function A is ascending-triangular. FIGS. 1F, 1G and 1H show a modulation function A, a sinusoidal carrier w and the activation signal Act, resulting from a sinusoidal carrier amplitude modulation by the modulation function, according to expression (1), respectively.

In each of these figures, the abscissa axis corresponds to time t (unit: second) and the ordinate axis corresponds to amplitude.

It is seen that the temporal shape of the modulation function A comprises, for each notch:
- an anterior time phase $dt_a$, occurring when the finger approaches the notch;
- a notch time phase $dt_c$, occurring when the finger crosses the notch;
- a posterior time phase $dt_p$, occurring when the finger moves away from the notch.

The anterior, notch and posterior time phases are activated successively. They define an activation sequence associated with the notch. Thus, for each notch, the activation signal forms an activation sequence corresponding to the succession anterior phase, notch phase, posterior phase. The duration of an activation sequence corresponds to the sum of the respective durations of the anterior, notch and posterior phases.

Generally speaking, each activation sequence corresponding to a notch is such that, during the notch phase, the amplitude of the modulation function A varies within a significantly larger range of variation than in the anterior and posterior phases of the sequence. The modulation amplitude determines the friction of the finger on the surface of the control member 2. The perception of a notch is realistic when, before and after the notch, the friction is relatively stable and when, at the time of the notch passing, the friction varies significantly. This results in a sudden variation in the speed of the finger when the notch passes, leading to the user perceiving a notch. The sudden variation in speed may be a deceleration, an acceleration or a combination of acceleration/deceleration. During the anterior and posterior phases preceding and following a notch, the variation in the modulation amplitude is less than during the notch phase. During the anterior and posterior phases, the modulation amplitude may be stable, for example zero, as shown in FIGS. 1F and 1H, without this being necessary. A stable modulation amplitude generates a sensation of flatness of the surface of the control member 2 before or after a virtual notch C passes.

Thus, if ΔA(t) corresponds to the amplitude variation, a notch time sequence may be such that:

$$\max_{dt_c}|\Delta A(t)| > \max_{dt_a,dt_p}|\Delta A(t)| \quad (2)$$

In the example of FIGS. 1F and 1H, during the notch phase $dt_c$, the modulation amplitude of the plate is gradually increased, thereby leading to an increasing perception of sliding: the speed of the finger increases. The notch phase ends with a break, causing the finger to suddenly slow down. The combination of acceleration/deceleration gives rise to a notch being perceived.

A time sequence corresponding to a notch is preferably such that, during the notch phase, the absolute value of the time derivative A'(t) of the modulation function has a higher maximum value than during the anterior and posterior phases. If A(t) corresponds to the modulation function:

$$\max_{dt_c}|A'(t)| > \max_{dt_a,dt_p}|A'(t)| \quad (3)$$

This reflects the fact that, during the notch phase, the modulation function undergoes a greater and/or faster amplitude variation than during the anterior and posterior phases. This results in a faster and/or larger variation in friction, giving rise to a notch being perceived by the finger.

Two notch phases, corresponding to two successive notches, are temporally spaced by a period dt. The period dt is adapted on the basis of a variation in the position of the finger 9 along the control member 2. For example, the period dt is shorter the higher the speed of movement of the finger: this results in a sensation, for the user's finger, of notches that are close in time. The period dt of the modulation function is thus adjusted on the basis of the speed of the finger in order to improve the realism of the perception of the notches.

The shape of each virtual notch and the spacing between each virtual notch are predefined digitally in the memory 16 connected to the control unit 15. The shape of a notch is understood to mean a shape felt by the finger in the activation sequence corresponding to the notch. On one and the same control member, the number of notches may be variable on the basis of the parameter 18 whose value it is desired to adjust. The same applies for the spacing between successive notches, the spacing not necessarily being regular. Therefore, the memory 16 connected to the control unit 15 may comprise, for one and the same control member, a library of virtual textures, each texture corresponding to a shape and to a distribution of notches on the control member 2.

Figure 1I:
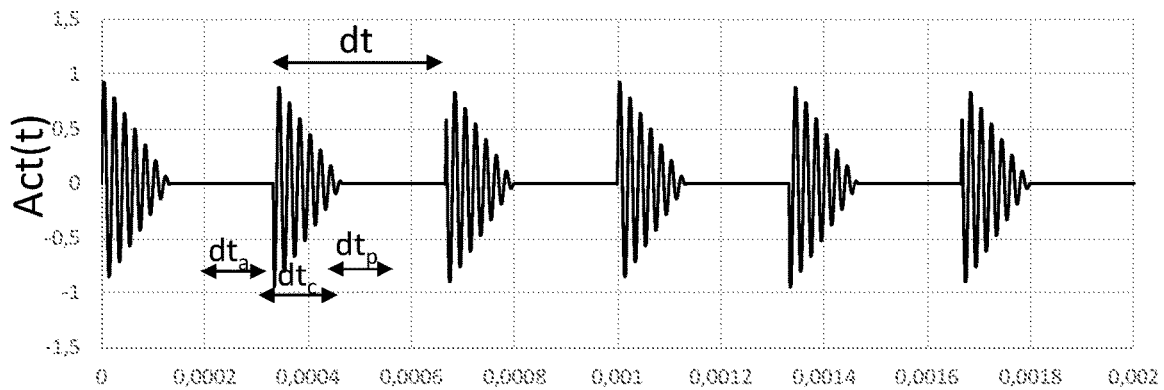
FIG. 1I shows another activation signal allowing the virtual notches shown in FIG. 1E to be felt.

In addition to the time period between two successive notches, it is possible to modulate the notch sensation perceived by the finger. FIG. 1I shows another example of an activation sequence for feeling another notch effect, different from the notch effect obtained according to the sequence shown in FIG. 1H. In FIG. 1I, the carrier is identical to the carrier shown in FIG. 1G. The modulation function is descending-triangular.

Other activation sequences producing a notch signal are conceivable, for example with a modulation function whose temporal form comprises slots or has a sinusoidal waveform. This allows a wide variety of notch sensations by the finger 9 to be obtained. For example, it is possible to obtain notches generating a perception of gradually increasing resistance. A sequence of notches is parameterized by the frequency and/or the shape of the carrier and/or the shape and/or the amplitude of the modulation function. The modulation function A may be composed of multiple elementary components for creating more complex effects.

The generation of a clicking effect, as described in connection with FIG. 1D, is generally performed by sending an uninterrupted activation sequence, of duration $\Delta t$, under the effect of pressure from the finger (or more generally from the external body 9) on the control member 2. An uninterrupted activation sequence is understood to mean an activation sequence extending between an initial time and a final time, without interruption.

Figure 4A:
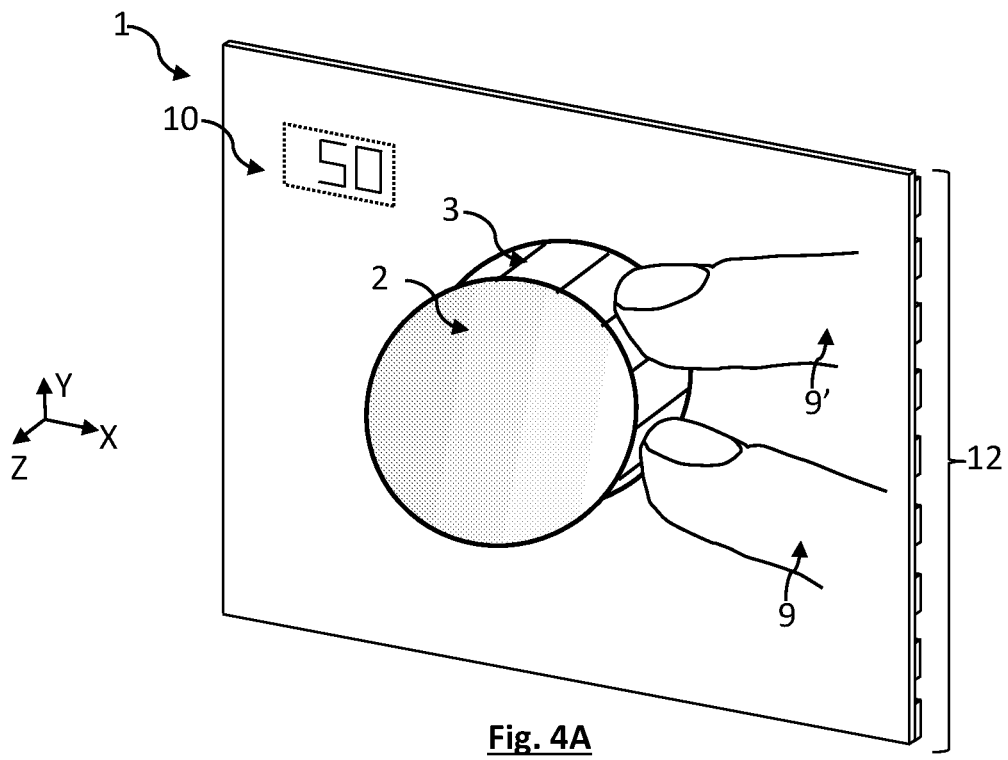
FIG. 4A illustrates one embodiment according to which an activation signal, allowing the generation of an ultrasonic vibration, is activated on the basis of a variation in a number of points of contact on the control member.
Figure 4B:
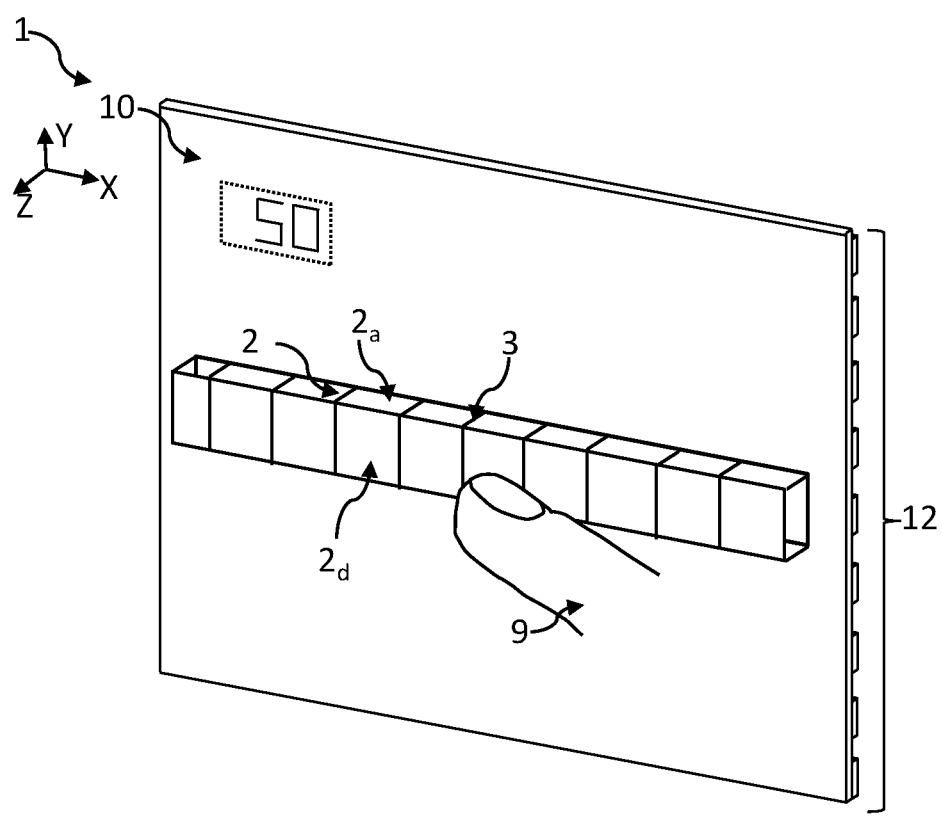
FIGS. 4B and 4C show a control member of parallelepipedal and frustoconical shape, respectively.

In one variant described in connection with FIG. 4A, the clicking effect may be activated upon a variation in the number of fingers contacting the control member 2.

According to one variant, the method may generate two successive close clicks, or even more, each click being spaced from another click by a short duration, while the finger maintains the pressure. The activation sequence corresponding to all of the clicks may preferably have a total duration of less than 10 ms.

In the example shown schematically in FIG. 2A, the control member is stationary with respect to the plate 10. It does not comprise any component that is mobile with respect to the plate 10. The same applies for the control member shown in FIGS. 2B to 2E. This corresponds to a particularly simple mechanical design of the interface.

In the example shown schematically in FIG. 2B, the sensor 14 does not comprise a pressure sensor $14_b$: the state signal S(t) sent to the control unit 15 comprises only a component Sa(t) representative of the position of contact of the finger 9 on the control member 2.

The control member 2 shown in FIG. 2C is particularly simple, since it does not comprise electrical conductors 3 (also referred to herein as "conductive elements" 3) extending from the proximal end $2_p$. In the example shown schematically in FIG. 2C, the sensor 14 does not comprise a position sensor $14_a$: the state signal S(t) sent to the control unit 15 comprises only a component Sb(t) representative of the pressure exerted by the finger 9 on the control member 2.

The screen 11 may be placed at a distance from the interface 1. This scenario is shown in FIG. 2D, in which the screen is integrated into the device 20 controlled by the interface 1, remotely from the interface.

In the example shown schematically in FIG. 2E, the interface 1 comprises a screen 11 occupying only part of the surface of the plate 10.

A description will now be given of some use examples of the interface 1.

First Use Example

According to a first use example, the interface 1 is as shown schematically in FIGS. 1A, 1B, 1C, 1E and 2A. The control unit 15 receives a state signal S(t) comprising a position component Sa(t) and a pressure component Sb(t). The user's finger 9 is able to slide around the control member 2, as shown in FIGS. 1A, 1C and 1E. The presence of the conductive elements 3, capacitively coupled to the conductive tracks 13, makes it possible to determine the position of the finger 9 on the control member 2. Depending on the position of the finger, or a variation in the position of the finger, the control unit 15 sends an activation signal Act(t) to each transducer 12, so as to form an ultrasonic vibration 19, modulating a friction of the finger 9 with the surface of the control member 2. This results in an impression of increased or reduced roughness. The user thus feels an effect of notches provided by the modulation of the friction. The modulation of the friction depends on the activation signal controlling the transducers 12. In order to obtain a notch effect, the activation signal may be as described in connection with FIGS. 1E to 1I.

According to one possibility, based on the position component Sa(t), the control unit 15 determines a position of the finger with respect to predetermined positions. The control unit 15 sends a "notch effect" activation sequence, as described in connection with FIGS. 1E to 1I, so as to bring about a notch sensation when the finger passes over a determined position. In the memory 16 connected to the control unit 15, a virtual notch C corresponds to each of the predetermined positions.

Figure 3A:
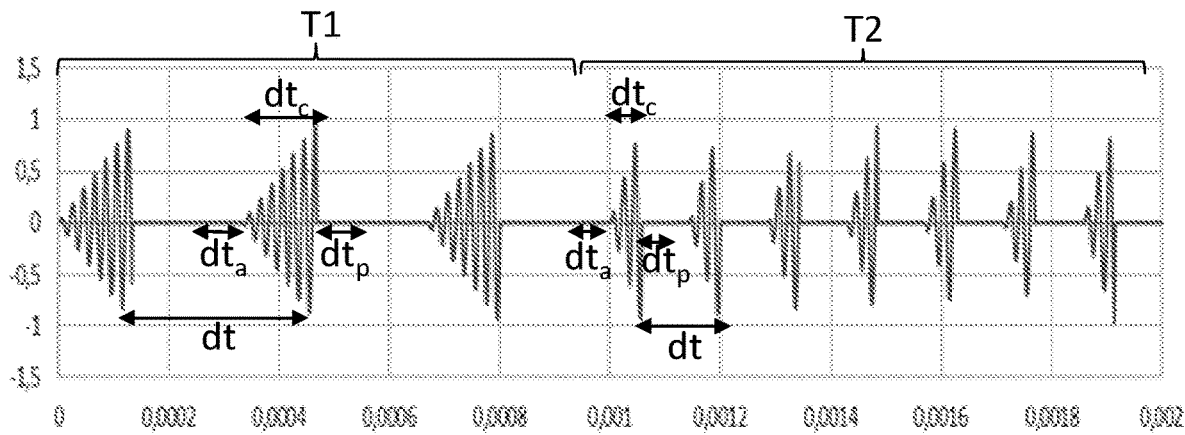
FIG. 3A illustrates an activation signal for forming an ultrasonic vibration propagating through the interface, under the effect of sliding of an external body, for example a finger, along the control member.

According to another possibility, based on the position component Sa(t), the control unit 15 determines a variation in the position of the finger, and, for example, a speed of movement of the finger along the control member 2. The activation signal may be parameterized on the basis of the speed of movement. For example, the higher the speed of movement, the more the period dt of the activation signal decreases. FIG. 3A shows a variation in an activation signal as a function of a speed of movement of a finger. During a first time interval T1, the finger slides along the control member 2 at a certain speed. During a second time interval T2, posterior to the time interval T1, the finger slides along the control member 2 at a higher speed. This results in the activation signal being modified. The activation signal, and in particular its period dt, may thus be modified on the basis of the speed of the finger along or around the control member 2.

As indicated above, when the finger 9 slides along the control member 2, the control unit 15 generates a notch effect. The notch effect mimics a sensation of notches, which would be obtained by moving a notched mechanical wheel.

When the finger 9 presses against the distal end $2_d$, in the direction of the plate 10, the pressure component Sb(t) is representative of the increase in the exerted pressure. When a pressure threshold P1, called first depression threshold, is reached, the control unit 15 sends a control signal Act(t) to the transducers, so that the transducers generate an ultrasonic vibration, in accordance with an activation sequence as described in connection with FIG. 1D. The duration $\Delta t$ of the activation sequence may, for example, be between 1 ms and 1 s, and preferably between 1 ms and 100 ms. The ultrasonic vibration 19 propagates as far as the control member 2, where it is felt indirectly by the user's finger 9.

The activation sequence forms a clicking effect that is felt by the user. The clicking effect performed by the interface mimics a mechanical clicking effect felt when depressing a conventional mechanical button using a finger. When the clicking effect is felt by the user, the user may then release the pressure.

Figure 3B:
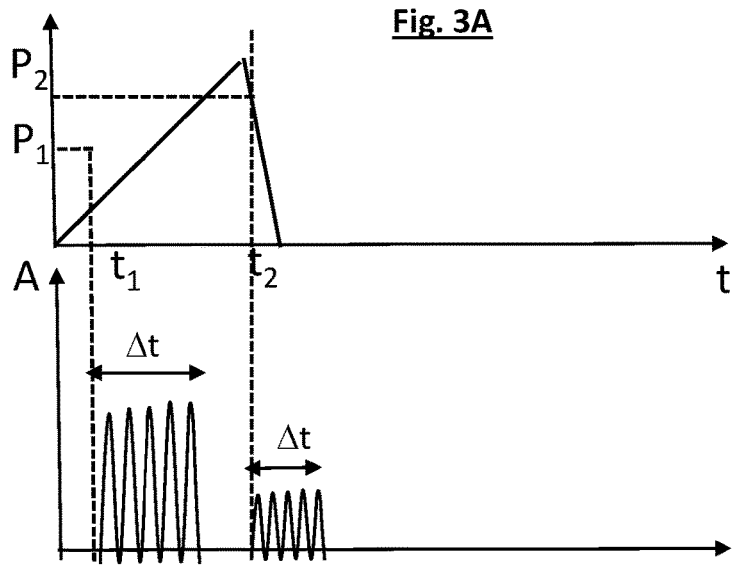
FIGS. 3B and 3C illustrate an activation signal for forming an ultrasonic vibration propagating through the interface, under the effect of pressure exerted by an external body, for example a finger, on the control member, toward the plate.

Optionally, under the effect of the user's finger being released, when the pressure applied to the plate 10 decreases and falls below a release threshold P2, the control unit 15 may send an activation signal to the transducers 12, so as to form a second clicking effect, similar to or different from the clicking effect generated when the first depression threshold P1 is crossed. An evolution of the pressure exerted on the plate as a function of time, as well as the vibration amplitude of the plate as a function of time, have been shown in FIG. 3B. At a time t1, the exerted pressure exceeds the depression threshold P1, thereby causing a clicking effect to be generated. The release threshold P2 is crossed at a time t2. In this example, the vibration amplitude A of the plate, when the release threshold is crossed, is lower than the vibration amplitude of the plate when the first depression threshold P1 is crossed. According to some alternatives, the duration $\Delta t$ of each activation sequence may be modulated: it may be longer when the first depression threshold P1 is passed and shorter when the release threshold P2 is crossed, or vice versa.

Thus, in order to trigger an activation sequence generating a clicking effect, the control unit 15 may take into account not only the pressure level exerted on the plate, but also the increasing or decreasing direction of variation in the pressure level. The depression threshold may be triggered while the exerted pressure is increasing, while the release threshold is triggered while the exerted pressure is decreasing.

Figure 3C:
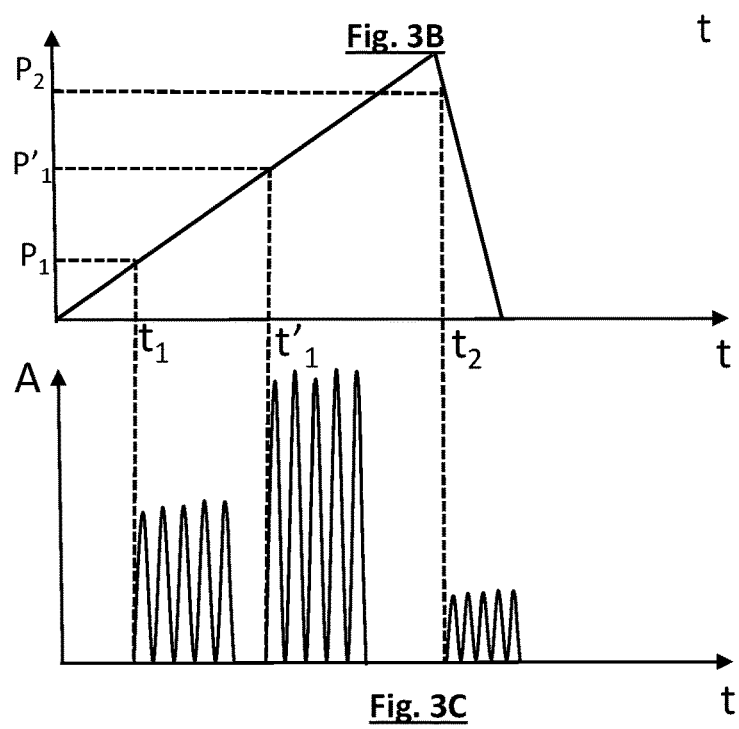

Optionally, multiple depression thresholds may be defined. This is illustrated in FIG. 3C: a second depression threshold P'1 is defined. When the second depression threshold P'1 is crossed, at the time t'1, while the pressure exerted on the plate is increasing, the control unit 15 may command an activation sequence of the transducers 12 different from the activation sequence triggered when the first depression threshold P1 is crossed. In the example shown in FIG. 3C, the vibration amplitude corresponding to the second depression threshold P'1 is greater than the vibration amplitude corresponding to the first depression threshold P1. The number of different depression thresholds may be greater than 2.

One exemplary application of such an embodiment corresponds to the adjustment of a value of a parameter 18, then the validation of the selected value. The finger 9 may slide around the side face $2_a$ of the control member 2. Depending on the evolution of the position of the finger with respect to various conductive elements 3, the control unit 15 determines a direction of rotation of the finger. Depending on the direction of rotation, and possibly the speed of rotation, the value of the parameter 18 is either increased or decreased by one or more increments. The control unit 15 defines the relationship between the position of the finger (and/or the speed of the finger) and the passage of one increment of the parameter. The value of the parameter 18 may be displayed on a part 11' of the screen 11, as shown in FIG. 1A.

The haptic feedback generated by the interface 1 allows the user to feel each increment, thereby allowing precise adjustment of the parameter 18. The haptic feedback corresponds to a notch effect, as described in connection with FIGS. 1E to 1I and with FIG. 3A. When an increment is crossed, the control unit 15 sends a control signal Com(t) to the device 20, so as to modify the value of the parameter by one increment.

In order to confirm a selected value of a parameter, the finger 9 presses on the distal end $2_d$ toward the plate 10. The resulting clicking effect makes it possible to provide information that the selected value is validated. When the user's finger 9 presses on the control member 2, the pressure gradually increases, up to a first depression threshold P1, as described in connection with FIG. 3B. The exerted pressure is detected by the pressure sensor $14_b$. The control unit 15 then generates an activation signal commanding an activation sequence of the transducers 12. This activation sequence is representative of a clicking effect. The haptic feedback generated by the interface allows the user to feel the clicking effect. The user is then informed that their pressing action has been taken into account by the interface 1. The control unit 15 also sends a control signal Com(t) to the device 20, so as to validate the value of the parameter selected by the user.

According to another exemplary application, when the finger moves along the control member 2, the screen 11 displays various options, in what is called a browsing mode. Upon each increment, a new option is offered. When the user wishes to retain an option, they validate the option that is offered by pressing their finger 9 on the distal end $2_d$.

Figure 5A:
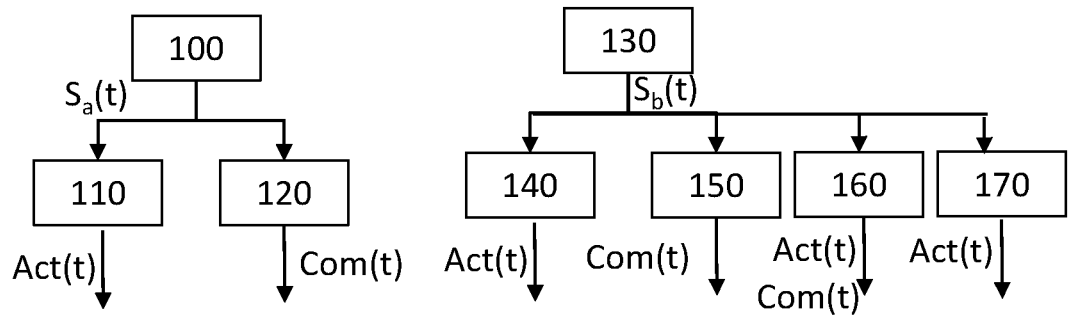
FIGS. 5A to 5D schematically show the main steps of various use examples.

The main steps of this first use example are summarized in FIG. 5A.

Step 100: detecting a position of a point of contact on the control member 2, using the position sensor $14_a$.

Step 110: when a change in the position of a point of contact has been detected, the control unit 15 triggering an activation signal Act(t) for the transducers 12, in accordance with one or more activation sequences representative of a notch effect.

Step 120: when a change in the position of a point of contact has been detected, the control unit 15 triggering a control signal Com(t) to the device 20, so as to adjust a parameter 18, or a value of the parameter 18.

Steps 110 and 120 may be implemented simultaneously.

Step 130: detecting a pressure exerted on the plate by the control member 2, using the pressure sensor $14_b$.

Step 140: when the exerted pressure increases and crosses the first depression threshold P1, the control unit 15 triggering an activation signal Act(t) for the transducers 12, in accordance with an activation sequence representative of a clicking effect.

Step 150: when the exerted pressure increases and crosses the first depression threshold P1, the control unit 15 triggering a control signal Com(t) to the device 20, so as to validate the selected parameter 18.

Steps 140 and 150 may be implemented simultaneously.

Step 160 (optional): when the exerted pressure increases and crosses the second depression threshold P'1, the control unit 15 triggering a control signal Com(t) to the device 20, so as to perform a complementary action, for example canceling the validation of the parameter. In parallel therewith, an activation signal Act(t) is sent to the transducers 12, in accordance with an activation sequence for a clicking effect corresponding to a second depression threshold. The clicking effect corresponding to the second depression threshold may be similar to the clicking effect corresponding to the first depression threshold, or different.

Step 170 (optional): when the exerted pressure decreases and crosses the release threshold P2, the control unit 15 triggering an activation signal Act(t) for the transducers 12, in accordance with an activation sequence representative of a clicking effect corresponding to a release of the pressure. This clicking effect may be similar to or different from the previous clicking effects.

Second Use Example

According to a second use example, described in connection with FIG. 2B, a notch effect, as described above, is generated when the user's finger slides along the control member 2, by interacting with various conductive elements 3, as described in connection with the first use example. This leads to haptic feedback from the interface through a notch effect.

According to this example, the interface 1 does not comprise a pressure sensor $14_b$. The user may move one or more fingers 9 on the side wall $2_a$ (also referred to herein as "side face" $2_a$ and "side surface" $2_a$), so as to slide successively facing various conductive elements 3. Such contact is detected by the position sensor $14_a$. This leads to haptic feedback from the interface through a notch effect, as described in connection with the first use example.

One exemplary application may be that of adjusting a value of a parameter when the finger 9 slides along the control member 2, as described in the first use example. During the adjustment, the control unit 15 sends a control signal Com(t) to the device 20, representing an adjustment of the value of the parameter.

Figure 5B:
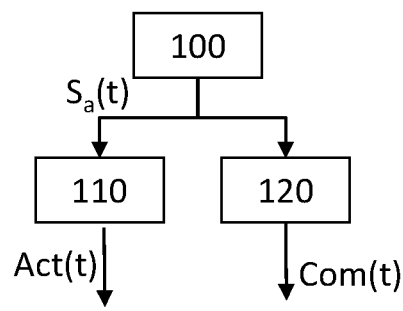

The main steps of this second use example are summarized in FIG. 5B. Steps 100 to 120 are described in the first use example.

Third Use Example

According to a third use example, described in connection with FIG. 2C, the interface 1 does not comprise a position sensor $14_a$. When the finger 9 presses against the distal end $2_d$, in the direction of the plate 10, the pressure component Sb(t) is representative of the increase (or decrease) in the pressure exerted by the finger 9. The activation signal sent by the control unit 15 to the transducers 12 depends on the pressure level and on the direction of variation in the pressure, as described in connection with the first use example and in FIGS. 3B and 3C.

Figure 5C:
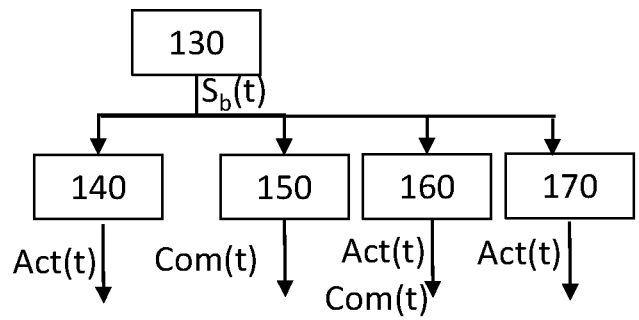

The main steps of this third use example are summarized in FIG. 5C. These steps are described in the first use example.

Fourth Use Example

According to a fourth embodiment, described in connection with FIG. 4A, the interface comprises a position sensor $14_a$, and possibly a pressure sensor $14_b$. According to this example, based on the component Sa(t) transmitted by the position sensor $14_a$, the control unit 15 generates haptic feedback depending on a number of points of contact identified by the position sensor, the number of points of contact increasing or decreasing. A first finger 9 and a second finger 9' have been shown in FIG. 4A. The control unit 15 may send an activation signal to the transducers 12 when the number of points of contact on the control member 2 is modified.

For example, as described above, when a single finger slides along the control member 2, the control unit 15 sends an activation signal corresponding to a notch effect. This phase may correspond to the adjustment of a value of a parameter.

When a second finger is applied to the control member, the position sensor detects two points of contact. In this case, the control unit 15 sends an activation signal corresponding to a clicking effect, different from the notch effect. This phase may correspond to the validation of the selected value of the parameter.

In such a use example, the value of the parameter is adjusted as described in connection with the first exemplary embodiment. The parameter is validated not by applying pressure, but by modifying the number of points of contact on the control member, by increasing or reducing the number of points of contact.

Figure 5D:
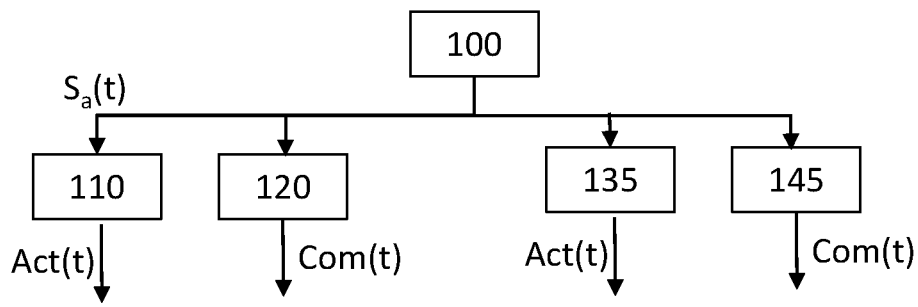

The main steps of this fourth use example are similar to those described in connection with FIG. 5D. In addition to steps 100, 110 and 120 described in connection with FIG. 5A, this use example comprises the following steps:

Step 135: when the position sensor detects a variation in the number of points of contact, the control unit 15 sends an activation signal Act(t) to the transducers 12, in accordance with an activation sequence representative of a clicking effect.

Step 145: when the position sensor detects a variation in the number of points of contact, the control unit 15 also sends a control signal Com(t) to the device 20, so as to validate the selected parameter 18.

Variants

In the above examples, the control member 2 has a cylindrical shape. As indicated above, other shapes may be envisaged. In the example shown in FIG. 4B, the control member 2 has a parallelepipedal shape. Various conductive elements 3 are spaced from one another, along the lateral axis X. The user's finger may slide along the side surface $2_a$ or the distal end $2_d$ of the control member, so as to successively contact various conductive elements 3, as described above. This makes it possible, for example, to adjust a value of a parameter, as explained in connection with the first, second and fourth use examples. The movement of the finger is detected by a position sensor $14_a$.

According to this variant, the interface 1 may comprise a pressure sensor $14_b$, so as to detect a pressure exerted on the control member 2 toward the plate 10.

Such a variant is compatible with the fourth use example, in which the control unit may take into account a variation in the number of points of contact on the control member 2.

Figure 4C:
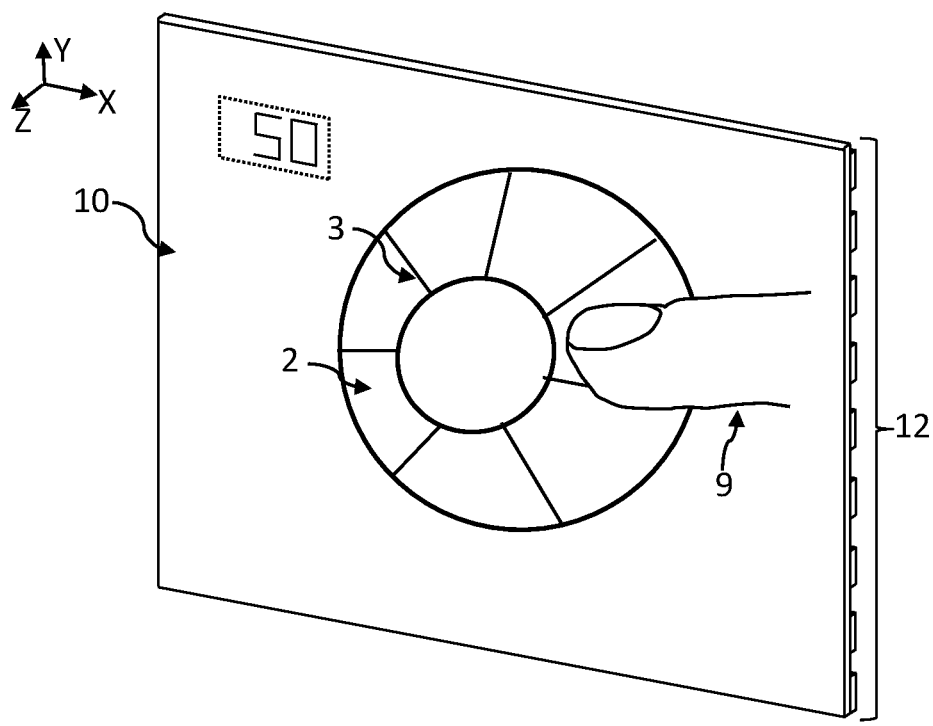

In the example shown in FIG. 4C, the control member 2 has a frustoconical shape.

Figure 4D:
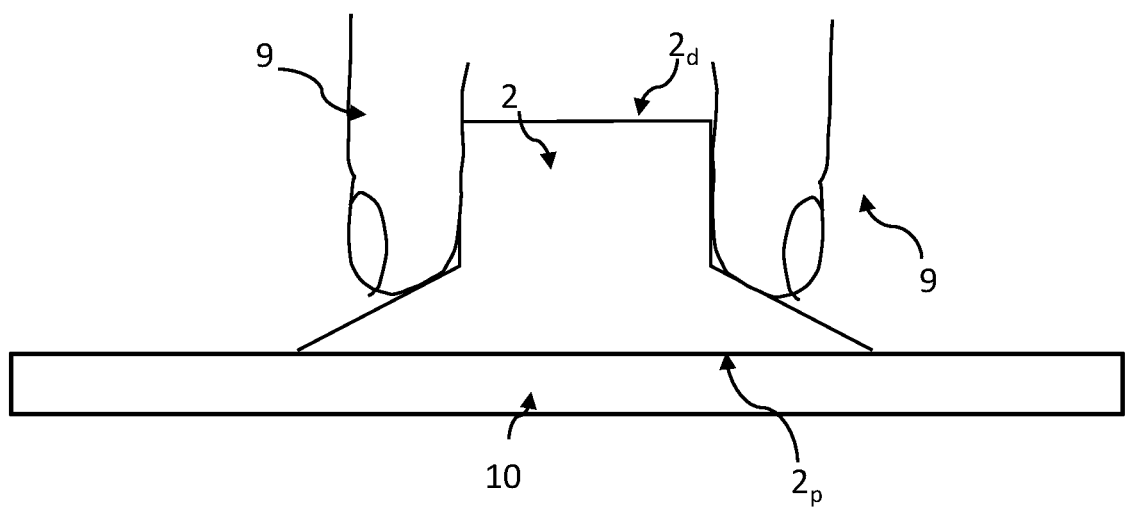
FIG. 4D shows one particular possible geometric shape of the control member.

A control member 2 whose geometric shape is particularly suitable for implementing the disclosure has been shown in FIG. 4D. The control member 2 extends, from the distal end $2_d$, in a cylindrical shape. It then flares out to the proximal end $2_p$, forming a skirt. When the one or more fingers 9 are applied to the interface between the cylindrical part and the skirt, the contact surface of the one or more fingers on the control member 2 is increased. This results in a better feeling of the haptic feedback. In addition, this flared shape has the advantage of reducing direct contact between the end of the one or more fingers 9 and the plate 10 when gripping the control member 2, this direct contact possibly interfering with the recognition of the position of the one or more fingers or the movement thereof on the control member 2.

The interface according to embodiments of the disclosure may be controlled using a finger of a user, or using any other external body 9 for coming into contact with the control member 2. When the position sensor implements capacitive detection, the external body is electrically conductive.

The interface is suitable for controlling consumer devices, for example in the field of household appliances. It makes it possible, for example, to control an oven temperature or a washing machine program, while still using robust control members that are simple and inexpensive to manufacture. Indeed, each control member might not comprise any moving parts. The interface makes it possible to exert haptic feedback perceptible to the user. Preferably, the haptic feedback mimics a mechanical response from a moving mechanical member. This makes the interface easy to use and user-friendly.

The interface is particularly suitable for controlling a device when the user's visibility is reduced or when the interface is located outside the user's field of view. This is, for example, the case when the user is a driver of an automobile or an aircraft pilot. The user is able to easily find and handle the control member 2, due to the fact that it extends in a three-dimensional volume. It is therefore not necessary to divert attention and to look at the control member. The control member may be easily manipulated while being outside the user's field of observation. This is a notable difference from a conventional touch screen.

The interface then combines the ease of handling and use of a mechanical control member, while still allowing modularity made possible by a touch screen: choice of various menus, adjustment and selection of various parameters. The haptic feedback constitutes a use aid, assuring the user that their action on the control member has been taken into account. The user may then manipulate the interface without having to modify their field of observation.

The interface 1 takes advantage of the ability to generate a wide variety of activation signals, making it possible to generate as many different clicking and/or notch effects. It does so using a device with a very simple mechanical design, since the control member 2 is able to remain static with respect to the plate 10, and is able to comprise no moving parts. This results in an interface with a low manufacturing cost and low mechanical wear, due to the absence of moving parts in the control member 2.

Another advantage is that the modification of the feeling of the haptic feedback may be obtained through simple parameterization of the activation signal. To this end, the control unit 15 may be subjected to specific programming, so as to adapt to a specific use. Modification of a feeling may be obtained with the same control member 2, requiring only modification of the programming or of the memory connected to the control unit.

The invention claimed is:

1. A touch interface, configured to control a device, the touch interface being configured to be touched by an external body, the touch interface comprising:
   a plate;
   at least one transducer configured to vibrate the plate at an ultrasonic vibration frequency;
   a control member extending from the plate, between a proximal end, applied against the plate, and a distal end, located at a distance from the plate, the control member being configured to be in contact with the external body, the control member being configured to be stationary with respect to the plate when it is actuated by the external body;
   a sensor configured to emit a state signal, the state signal being representative of a contact of the external body on the control member; and
   a control unit connected to the sensor and configured to send, using the state signal, an activation signal to at least one of the at least one transducer, so as to vibrate the plate and the control member, such that, under effect of an ultrasonic vibration propagating from the plate to the control member, a friction of the external body with respect to the control member is modified, leading to haptic feedback from the touch interface;
   so that, when the external body moves along the control member or applies a pressure against the control member, the at least one transducer vibrates the plate ultrasonically, so as to modify the friction between the control member and the external body, thereby providing the haptic feedback to the external body.

2. The touch interface of claim 1, wherein the control unit is configured to send a control signal to the device using the state signal.

3. The touch interface of claim 1, wherein:
   the sensor comprises a pressure sensor configured to measure a pressure exerted by the control member on the plate;
   the state signal comprises a pressure component depending on the pressure exerted; and
   the control unit is configured to send the activation signal to the at least one transducer when the pressure crosses a predetermined threshold or depending on a pressure variation.

4. The touch interface of claim 3, wherein the pressure sensor comprises:
   a rangefinder arranged facing the plate and configured to measure a distance separating the rangefinder from the plate, the rangefinder being configured to determine a deformation of the plate under an effect of a pressure exerted on the plate;
   a strain gauge designed to deform under an effect of the deformation of the plate under the effect of the pressure exerted on the plate;
   a dynamometer arranged in contact with the plate and configured to detect a movement of the plate under the effect of the pressure exerted on the plate; or
   a transducer configured to measure a variation in a vibration of the plate, the variation resulting from the pressure exerted on the plate.

5. The touch interface of claim 3, wherein, depending on the pressure component measured by the pressure sensor, the control unit is configured to send the activation signal forming an activation sequence, the activation sequence being parameterized such that a clicking effect is felt by the external body, the clicking effect forming haptic feedback from the touch interface.

6. The touch interface of claim 1, wherein:
   the sensor comprises a capacitive position sensor connected to a network of conductive tracks extending parallel to the plate;
   the control member is formed of an electrically insulating material and comprises conductive elements, electrically insulated from one another, extending between the proximal end and the distal end; and
   at least one conductive track, of the network of conductive tracks, is arranged in capacitive contact with at least one conductive element, of the conductive elements of the control member, so as to allow a charge transfer, through a capacitive effect, between the external body and the at least one conductive track, by way of the at least one conductive element;
   such that the state signal comprises a position component depending on a position of the contact between the external body and the control member.

7. The touch interface of claim 6, wherein the control unit is configured to send the activation signal to the at least one of the at least one transducer when the position component undergoes a variation representative of a variation in the position of the contact between the external body and the control member.

8. The touch interface of claim 6, wherein, depending on the position component measured by the capacitive position sensor, the activation signal is parameterized such that a notch effect is felt by the external body, the notch effect forming haptic feedback from the touch interface, the notch effect corresponding to the external body feeling at least one virtual notch on the control member.

9. The touch interface of claim 8, wherein the activation signal is established from:
a periodic carrier wave, the periodic carrier wave extending, in each period, over an amplitude; and
an amplitude modulation function varying with the position component;
such that the amplitude of the activation signal results from a modulation of the periodic carrier wave by the amplitude modulation function.

10. The touch interface of claim 9, wherein the amplitude modulation function successively comprises:
an anterior phase when the external body approaches a notch;
a notch phase when the external body crosses the notch; and
a posterior phase when the external body moves away from the notch;
such that the feeling of the at least one virtual notch by a user depends on the amplitude modulation function during the anterior phase, the notch phase, and the posterior phase;
wherein, in the notch phase, the amplitude modulation function varies over a wider range of variation than in the anterior phase and in the posterior phase.

11. The touch interface of claim 10, wherein, in the notch phase, the amplitude modulation function is such that an absolute value of its time derivative reaches a higher maximum value than in the anterior phase and in the posterior phase.

12. The touch interface of claim 1, wherein the control member does not comprise any component that is mobile with respect to the plate.

13. The touch interface of claim 1, wherein the control member has a geometric shape of a button or a control wheel or a slider.

14. The touch interface of claim 1, wherein the plate is connected to a plurality of transducers of the at least one transducer.

15. The touch interface of claim 1, wherein the plate is a transparent or opaque rigid plate.

16. The touch interface of claim 1, wherein the touch interface further comprises a screen, and wherein:
the plate is transparent; and
the plate is arranged against the screen.

17. A device, configured to be controlled by a parameter, and comprising a touch interface configured to select the parameter or set a value of the parameter, wherein the touch interface is the touch interface of claim 1, the touch interface being configured to determine the value of the parameter or to select the parameter using the state signal.

18. A method for controlling the touch interface of claim 1, the method comprising:
applying the external body to the control member;
the sensor forming the state signal, the state signal being representative of at least one of:
a position of the external body on the control member; and/or
a pressure exerted by the control member on the plate, under an effect of the external body;
the control unit emitting, using the state signal, the activation signal for the one of the at least one transducer or for each of the at least one transducer; and
under an effect of the activation signal, vibrating the plate, such that the ultrasonic vibration propagates through the control member, so as to modify the friction between the control member and the external body so as to bring about the haptic effect from the touch interface on the external body.

19. The method of claim 18, wherein the sensor comprises a pressure sensor configured to measure the pressure exerted by the control member on the plate, the state signal comprises a pressure component depending on the pressure exerted; the control unit is configured to send the activation signal to the at least one transducer when the pressure crosses a predetermined threshold or depending on a pressure variation, and wherein:
applying the external body to the control member comprises the external body applying a pressure on the control member, in a direction of the plate;
the sensor forming the state signal comprises forming the state signal to be further representative of the pressure exerted by the external body on the control member; and
the control unit emitting the activation signal comprises the control unit emitting the activation signal, the activation signal depending on the pressure and/or of a variation in the pressure.

20. The method of claim 18, wherein the sensor comprises a capacitive position sensor connected to a network of conductive tracks extending parallel to the plate; the control member is formed of an electrically insulating material and comprises conductive elements, electrically insulated from one another, extending between the proximal end and the distal end; and at least one conductive track of the network of conductive tracks is arranged in capacitive contact with at least one conductive element of the conductive elements of the control member so as to allow a charge transfer, through a capacitive effect, between the external body and the at least one conductive track, by way of the at least one conductive element; such that the state signal comprises a position component depending on the position of the external body on the control member; and wherein:
applying the external body to the control member comprises the external body being electrically conductive and moving on the control member, facing various of the conductive elements;
the sensor forming the state signal comprises the sensor forming the state signal to be further representative of a variation in the position of the external body on the control member; and
the control unit emitting the activation signal comprises the control unit emitting the activation signal depending on the variation in the position of the external body.

21. The method of claim 18, wherein:
applying the external body to the control member comprises the external body being electrically conductive and the control member being capable of being contacted, simultaneously, at various points of contact, in interaction with various conductive elements;
the sensor forming the state signal comprises forming the state signal to be further representative of a number of points of contact; and the control unit emitting the activation signal comprises the control unit emitting the activation signal, the activation signal depending on a variation in the number of points of contact.

22. The method of claim 18, further comprising the control unit sending a control signal to the device using the state signal formed by the sensor.

23. The method of claim 18, wherein the external body is a finger of a user.

\* \* \* \* \*